United States Patent
Chen et al.

(10) Patent No.: US 9,288,832 B2
(45) Date of Patent: Mar. 15, 2016

(54) WIRELESS APPARATUS, BASE STATION, AND COMMUNICATION CONTROLLING METHOD THEREOF

(75) Inventors: Chiu-Wen Chen, Taipei (TW);
Shiann-Tsong Sheu, Taipei (TW);
Chun-Yen Hsu, Chiayi County (TW)

(73) Assignee: Institute For Information Industry, Taipei (TW)

( * ) Notice: Subject to any disclaimer, the term of this patent is extended or adjusted under 35 U.S.C. 154(b) by 650 days.

(21) Appl. No.: 13/346,250

(22) Filed: Jan. 9, 2012

(65) Prior Publication Data
US 2012/0178379 A1 Jul. 12, 2012

Related U.S. Application Data

(60) Provisional application No. 61/431,074, filed on Jan. 10, 2011, provisional application No. 61/553,976, filed on Nov. 1, 2011.

(51) Int. Cl.
| H04B 1/00 | (2006.01) |
|---|---|
| H04B 7/00 | (2006.01) |
| H04W 76/02 | (2009.01) |
| H04W 52/02 | (2009.01) |

(52) U.S. Cl.
CPC ........ *H04W 76/027* (2013.01); *H04W 52/0206* (2013.01); *H04W 52/0219* (2013.01); *Y02B 60/50* (2013.01)

(58) Field of Classification Search
CPC .......................... H04L 12/1895; H04L 76/028
USPC ........................................................... 455/68
See application file for complete search history.

(56) References Cited

U.S. PATENT DOCUMENTS

| 6,418,148 B1 | 7/2002 | Kumar et al. |
| 6,731,907 B1 | 5/2004 | Seon |
| 6,807,170 B1 * | 10/2004 | Dendi et al. ................. 370/354 |
| 7,272,397 B2 | 9/2007 | Gallagher et al. |
| 7,349,698 B2 | 3/2008 | Gallagher et al. |
| 7,454,207 B2 | 11/2008 | Gallagher et al. |

(Continued)

FOREIGN PATENT DOCUMENTS

| WO | 0147299 A1 | 6/2001 |
| WO | 2010027175 A2 | 3/2010 |

OTHER PUBLICATIONS

Johnson, Chris, "Long term evolution in bullets-RRC Connection Establishment", May 7, 2010, 4 pages.

(Continued)

*Primary Examiner* — Eugene Yun
(74) *Attorney, Agent, or Firm* — Skaar Ulbrich Macari, P.A.

(57) ABSTRACT

A wireless apparatus, a base station, and a communication controlling method are provided. A communication controlling system comprises the wireless apparatus and the base station. The wireless apparatus is configured to transmit a connection request to the base station and then enter a connection setup communication procedure. The wireless apparatus enters a temporary waiting status during a waiting duration after transmitting the connection request. The wireless apparatus stays in the connection setup communication procedure in the temporary waiting status. The communication controlling method is able to perform the same operations as those performed by the wireless apparatus and the base station is able to perform the operations corresponding to the wireless apparatus.

45 Claims, 21 Drawing Sheets

(56) References Cited

U.S. PATENT DOCUMENTS

| | | | |
|---|---|---|---|
| 7,747,256 | B2 | 6/2010 | Hanov et al. |
| 7,814,193 | B2 | 10/2010 | Qiu et al. |
| 7,974,624 | B2 | 7/2011 | Gallagher et al. |
| 8,694,017 | B2 * | 4/2014 | Bhushan .................... 455/452.2 |
| 2004/0224709 | A1 | 11/2004 | Yi et al. |
| 2006/0063544 | A1 | 3/2006 | Zhao et al. |

OTHER PUBLICATIONS

3rd Generation Partnership Project; Technical Specification Group Radio Access Network; Evolved Universal Terrestrial Radio Access (E-UTRA); Radio Resource Control (RRC); Protocol specification (Release 10), 3GPP, France, Dec. 19, 2010, 276 pages.

3rd Generation Partnership Project; Technical Specification Group Services and System Aspects; System Improvements for Machine-Type Communications; (Release 10); 3GPP, France, Sep. 22, 2010, 80 pages.

Instutute for Information Industry (III) et al.: "Discussion on CN Overload Avoidance for MTC"; USA, Nov. 15, 2010, 2 pages.

Instutute for Information Industry (III) et al.: "Delay Tolerant Scheme for Extending Wait-timer"; Ireland, Jan. 17, 2010, 8 pages.

Extended European Search Report for the European corresponding patent application 10150610.9 to the present US application, Apr. 26, 2012, 14 pages.

Office Action to the corresponding Taiwan Patent Application rendered by Taiwan Intellectual Property Office (TIPO) on Sep. 22, 2014, 17 pages (including English translation).

ETSI 3rd Generation Partnership Project, 3rd Generation Partnership Project; Technical Specification Group Radio Access Network: Evolved Universal Terrestrial Radio Access (E-UTRA): Radio Resource Control (RRC); Protocol specification (Release 10), 3GPP TS 36.331, Version 10.0.0, pp. 1-280, Jan. 2011, 280 pages.

* cited by examiner

WIRELESS APPARATUS, BASE STATION, AND COMMUNICATION CONTROLLING METHOD THEREOF

PRIORITY

This application claims the benefit of priorities based on U.S. Provisional Application Ser. No. 61/431,074 filed on Jan. 10, 2011 and U.S. Provisional Application Ser. No. 61/553,976 filed on Nov. 1, 2011, both of which are hereby incorporated by reference herein in their entirety.

FIELD

The present invention relates to a wireless apparatus, a base station, and a communication controlling method thereof. More particularly, the wireless apparatus, the base station, and the communication controlling method thereof according to the present invention have the wireless apparatus stay in a connection setup communication procedure when the wireless apparatus fails to establish connection with the base station immediately so that a connection can be set up successfully after a waiting duration.

BACKGROUND

With advancement of the science and technologies, wireless communication network technologies have been developed in succession to meet various demands on wireless communications. In recent years, machine-to-machine (M2M) wireless communication networks have emerged gradually. An M2M wireless communication network allows different apparatuses to communicate with and exchange data with each other with minimal human-machine interactions. As an example, the M2M communication may be applied in dynamic electrocardiogram (ECG) to monitor a subject's physiological conditions by periodically uploading the subject's electrocardio response data. As another example, the M2M communication may be applied in a reservoir water level monitor to provide data for reference or to give an alert by periodically monitoring the water level of the reservoir.

However, an M2M wireless communication network comprises wireless apparatuses and a base station, and the number of the wireless apparatuses is usually very large. When wireless apparatuses are to set up connections with the base station, the wireless apparatuses must send connection requests to the base station individually. If the base station or an evolved packet core (EPC) network to which the base station connects is in a loadable status, it means that the base station is able to set up a connection with a wireless apparatus and then the base station transmits a connection setup signal back to the wireless apparatus so that the wireless apparatus transmits a connection setup complete signal to the base station. In this way, the connection is set up between the wireless apparatus and the base station so that the wireless apparatus can upload information to or download information from the base station.

If the base station or the EPC network to which the base station connects is in an overload status when the connection request is received by the base station, it means that the base station is currently unable to set up a connection with the wireless apparatus. Then, the base station transmits a connection reject signal back to the wireless apparatus. The connection reject signal, which carries a time length of a waiting duration, instructs the wireless apparatus to exit from the connection setup communication procedure and then transmit a retransmitted connection request to the base station after the waiting duration so as to start a new connection setup communication procedure again.

As can be known from the above descriptions, if the base station or the EPC network to which the base station connects is in an overload status continuously, the wireless apparatus will start new connection setup communication procedures repeatedly in the prior art. This will postpone the time for the wireless apparatus and the base station to set up a connection therebetween and lead to a signal overload status of the base station, which makes it impossible to efficiently set up a connection with the wireless apparatus. Accordingly, an urgent need exists in the art to provide a mechanism for an M2M wireless apparatus to set up a connection with a base station efficiently.

SUMMARY

To solve the aforesaid problem, the present invention provides a wireless apparatus, a base station and a communication controlling method thereof. The wireless apparatus and the base station belong to a communication controlling system.

The present invention according to certain embodiments provides a wireless apparatus, which comprises a transceiver and a processor which are electrically connected to each other. The transceiver is configured to transmit a connection request to the base station so that the wireless apparatus enters a connection setup communication procedure. The processor is configured to, after the connection request is transmitted by the transceiver, enable the wireless apparatus to enter a temporary waiting status during a waiting duration so that the wireless apparatus stays in the connection setup communication procedure in the temporary waiting status.

The present invention in certain embodiments further provides a base station, which comprises a transceiver and a processor which are electrically connected to each other. The transceiver is configured to receive a connection request from the wireless apparatus so that the wireless apparatus enters a connection setup communication procedure after transmitting the connection request. The processor is configured to determine a status of the communication controlling system. The status is one of a loadable status and an overload status. The wireless apparatus enters a temporary waiting status during a waiting duration after transmitting the connection request, and stays in the connection setup communication procedure in the temporary waiting status.

The present invention further in certain embodiments provides a communication controlling method, which is suitable for use in a communication controlling system. The communication controlling method comprises the following steps: (a) enabling a wireless apparatus of the communication controlling system to transmit a connection request to the base station so that the wireless apparatus enters a connection setup communication procedure; (b) enabling the wireless apparatus to enter a temporary waiting status during a waiting duration after transmitting the connection request; and (c) enabling the wireless apparatus to stay in the connection setup communication procedure in the temporary waiting status.

According to the base station, the wireless apparatus and the communication controlling method of the present invention, the wireless apparatus enters a waiting duration after transmitting the connection request in the connection setup communication procedure and enters a temporary waiting status during the waiting duration. The wireless apparatus stays in the connection setup communication procedure in the temporary waiting status. In this way, it is unnecessary for the mobile apparatus to repeatedly start new connection setup communication procedures continuously, so the time for the wireless apparatus and the base station to set up a connection therebetween will not be postponed and an overload status of the base station due to repeatedly receiving a connection request from a same wireless apparatus can be avoided.

The detailed technology and preferred embodiments implemented for the subject invention are described in the following paragraphs accompanying the appended drawings for people skilled in this field to well appreciate the features of the claimed invention. It is understood that the features mentioned hereinbefore and those to be commented on hereinafter may be used not only in the specified combinations, but also in other combinations or in isolation, without departing from the scope of the present invention.

DETAILED DESCRIPTION

In the following description, the wireless apparatus, the base station and the communication controlling method thereof according to the present invention will be explained with reference to example embodiments thereof. However, these example embodiments are not intended to limit the present invention to any specific example, embodiment, environment, applications or particular implementations described in these embodiments. Therefore, description of these example embodiments are only for purpose of illustration rather than to limit the present invention. It should be appreciated that, in the following example embodiments and the attached drawings, elements unrelated to the present invention are omitted from depiction.

Figure 1A:
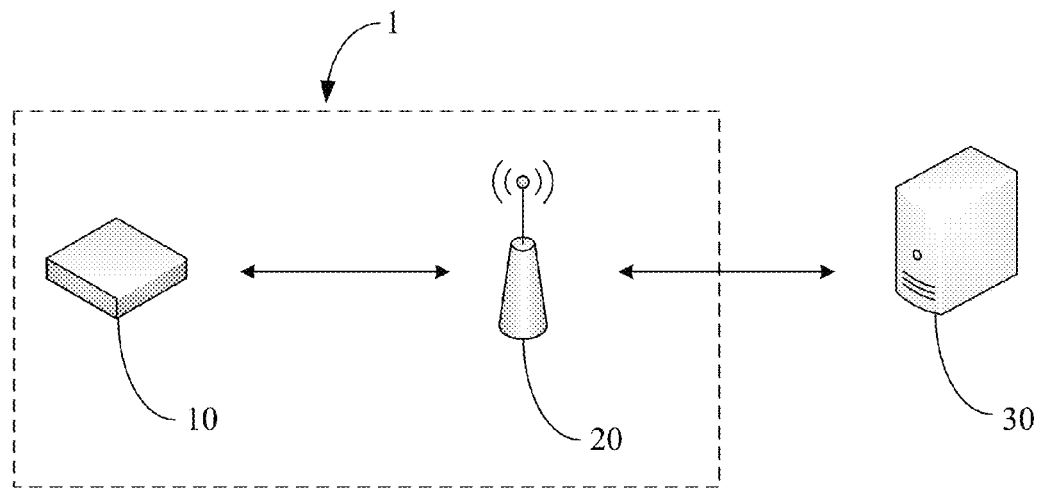
FIG. 1A is a schematic view of a communication controlling system according to the present invention.
Figure 1B:
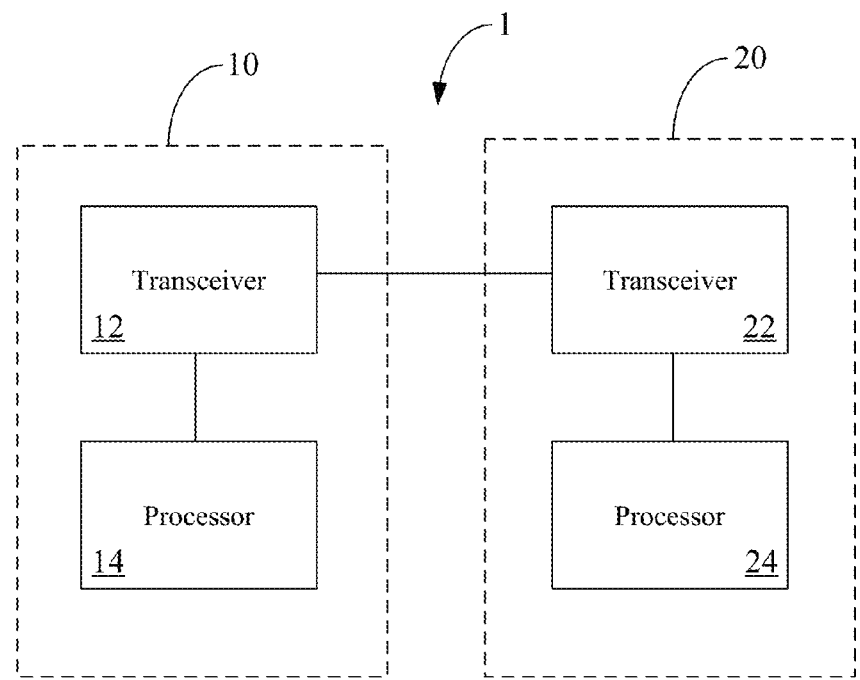
FIG. 1B is a functional block diagram of the communication controlling system according to the present invention.

A schematic view and a functional block diagram of a communication controlling system 1 according to the present invention are shown in FIG. 1A and FIG. 1B respectively. The communication controlling system 1 comprises a wireless apparatus 10 and a base station 20. The wireless apparatus 10 and the base station 20 may communicate with each other either wirelessly or in a wired way. The base station 20 and an EPC network 30 may also communicate with each other either wirelessly or in a wired way. When the communication controlling system 1 complies with the Long Term Evolution (LTE) standard of the 3rd Generation Partnership Project (3GPP), the EPC network 30 is a backend serving network system and may comprise a mobility management entity (MME), a serving gateway (S-GW), and a packet data network gateway (P-GW).

The wireless apparatus 10 may be a machine-to-machine (M2M) apparatus, but the present invention is not limited to this. The wireless apparatus 10 comprises a transceiver 12 and a processor 14, which are electrically connected with each other. The transceiver 12 of the wireless apparatus 10 is configured to transmit a connection request to the base station 20 so that the wireless apparatus 10 enters a connection setup communication procedure. After the connection request is transmitted by the transceiver 12, the processor 14 enables the wireless apparatus 10 to enter a temporary waiting status during a waiting duration so that the wireless apparatus 10 stays in the connection setup communication procedure in the temporary waiting status.

The so-called "temporary waiting status" is a status in which the wireless apparatus 10 is waiting to set up a connection with the base station 20. The so-called "connection setup communication procedure" is a procedure in which the wireless apparatus 10 is going to set up a connection with the base station 20.

On the other hand, the base station 20 comprises a transceiver 22 and a processor 24, which are electrically connected with each other. The transceiver 22 is configured to receive a connection request from the transceiver 12 of the wireless apparatus 10. The processor 24 is configured to determine a status of the communication controlling system 1, and the status may be a loadable status or an overload status. It shall be further appreciated that the overload status is a status in which one of the base station 20 and the EPC network 30 to which the base station 20 connects is in a busy status and is unable to set up a connection with the wireless apparatus 10 for data transmission therebetween. In addition, the loadable status is a status in which the base station 20 and the EPC network 30 allow a new connection and are able to set up a connection with the wireless apparatus 10.

Figure 2:
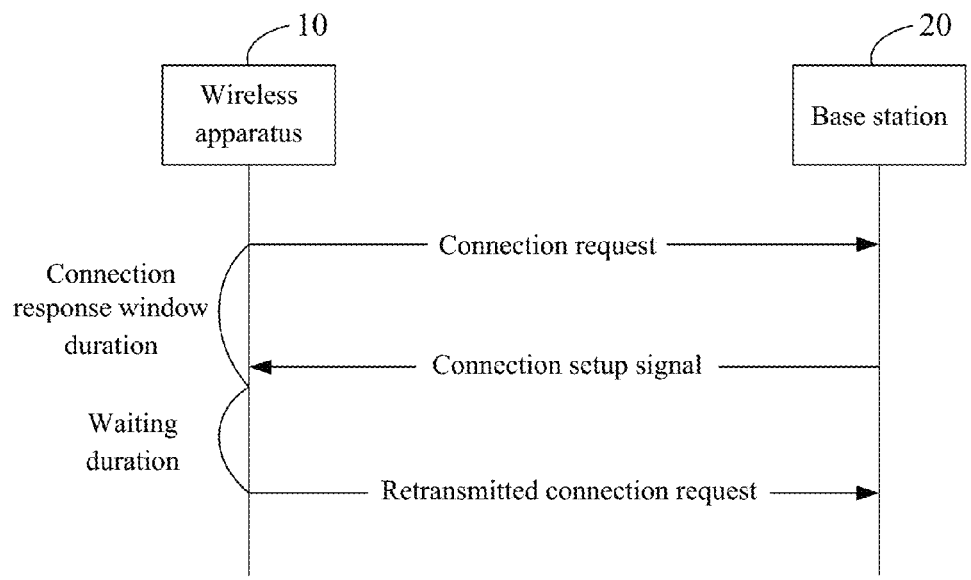
FIG. 2 is a timing flowchart diagram of a first embodiment of the communication controlling system according to the present invention.

Referring to FIG. 2, there is shown a timing flowchart diagram of a first embodiment of the communication controlling system 1 according to the present invention. The transceiver 12 firstly transmits a connection request to the transceiver 22 of the base station 20 to enter a connection setup communication procedure. The processor 14 of the wireless apparatus 10 initiates a connection response window duration after the connection request is transmitted by the transceiver 12. In this embodiment, the transceiver 12 does not receive a connection setup signal from the transceiver 22 of the base station 20 during the connection response window duration, and this means that one of the base station 20 and the EPC network 30 is in an overload status currently and is unable to accept the connection request of the wireless apparatus 10. Therefore, the processor 14 initiates a waiting duration when the connection response window duration expires. The wireless apparatus 10 enters a temporary waiting status during the waiting duration so that the wireless apparatus 10 stays in the connection setup communication procedure in the temporary waiting status. The transceiver 12 transmits a retransmitted connection request to the transceiver 22 of the base station 20 when the waiting duration expires.

It shall be further appreciated that the waiting duration is a default duration built in the wireless apparatus 10. The wireless apparatus 10 may be either in a power-saving status or in a non-power-saving status during the waiting duration. The so-called "power-saving status" is a status in which the wireless apparatus has low power consumption. All pieces of information carried in the aforesaid connection request are used to request for connection with the base station 20 (for example but not limited to the establishment cause, the delay tolerant indicator and etc.). Thereby, the base station 20 can determine a priority order of setting up a connection with the wireless apparatus 10 according to these pieces of information so as to determine whether to accept, temporarily accept, reject or temporarily reject the connection request of the wireless apparatus 10. Furthermore, the pieces of information carried in the aforesaid retransmitted connection request may be identical to those carried in the connection request (i.e., are all used to request for connection with the base station 20). However, the retransmitted connection request may also carry other pieces of information (e.g., counter information related to the number of times of rejected connections); thereby, the base station 20 can determine a priority order of setting up a connection with the wireless apparatus 10 according to these pieces of information so as to determine whether to accept, temporarily accept, reject or temporarily reject the connection request of the wireless apparatus 10.

Figure 3:
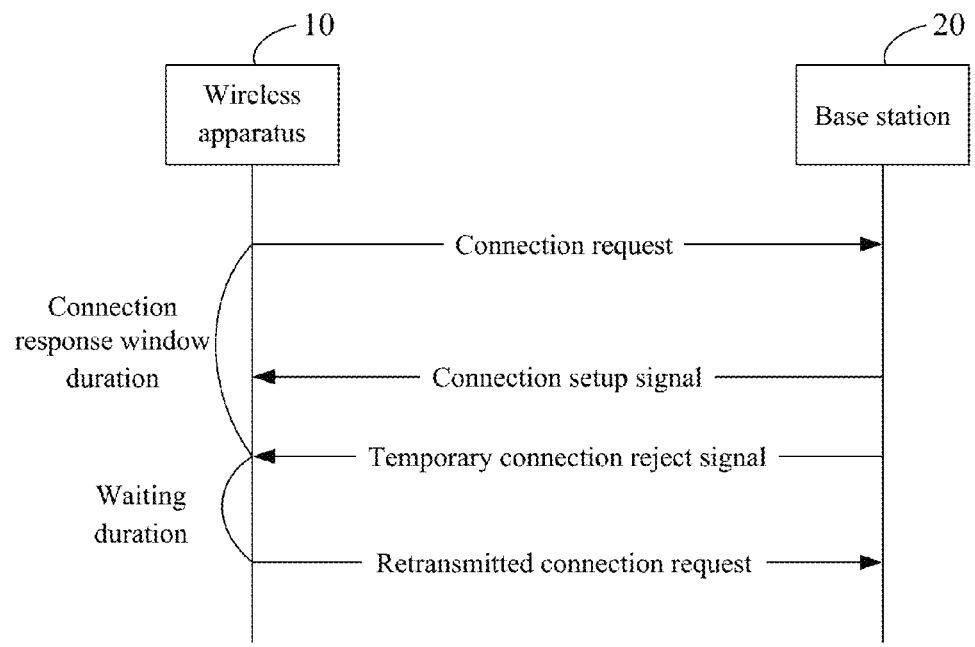
FIG. 3 is a timing flowchart diagram of a second embodiment of the communication controlling system according to the present invention.

Referring to FIG. 3, there is shown a timing flowchart diagram of a second embodiment of the communication controlling system 1 according to the present invention. The transceiver 12 of the wireless apparatus 10 firstly transmits a connection request to the transceiver 22 of the base station 20 to enter a connection setup communication procedure. The processor 14 of the wireless apparatus 10 initiates a connection response window duration after the connection request is transmitted by the transceiver 12. In this embodiment, the transceiver 12 does not receive a connection setup signal from the transceiver 22 of the base station 20 during the connection response window duration, and further receives a temporary connection reject signal from the transceiver 22 of the base station 20 when the connection response window duration expires. This means that one of the base station 20 and the EPC network 30 is in an overload status currently and is unable to accept the connection request of the wireless apparatus 10 temporarily. The temporary connection reject signal carries a waiting duration, and the wireless apparatus 10 enters the waiting duration after the temporary connection reject signal is received by the transceiver 12 thereof. The wireless apparatus 10 enters a temporary waiting status during the waiting duration so that the wireless apparatus 10 stays in the connection setup communication procedure in the temporary waiting status. If the transceiver 12 has not received the connection setup signal yet when the waiting duration expires, then the transceiver 12 transmits a retransmitted connection request to the transceiver 22 of the base station 20 when the waiting duration expires.

The waiting duration is determined by the base station 20 according to at least one parameter. The at least one parameter can reflect the status of the base station 20 and/or the EPC network 30 or reflect a time duration after which both the base station 20 and the EPC network 30 will turn into the loadable status. Besides, the at least one parameter may be a time arrangement that can prevent some other wireless apparatus from transmitting a retransmitted connection request to the base station 20 at the same time as the wireless apparatus 10. That is, if a plurality of wireless apparatuses contend to set up connections simultaneously and one of the base station 20 and the EPC network 30 is unable to set up connections with all these wireless apparatuses at the same time, then the base station 20 allocates waiting durations of different time lengths to the wireless apparatuses respectively so that the wireless apparatuses transmit retransmitted connection requests at different times respectively.

Figure 4:
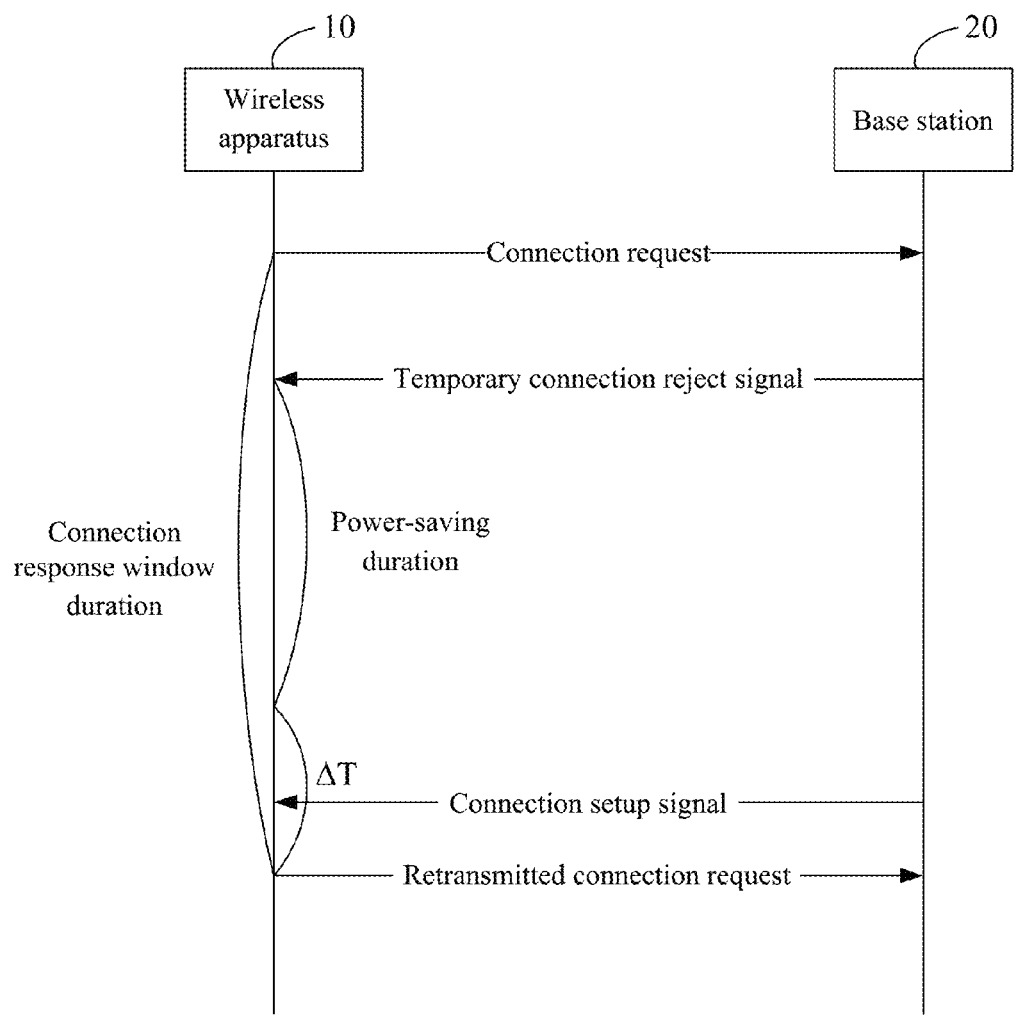
FIG. 4 is a timing flowchart diagram of a third embodiment of the communication controlling system according to the present invention.

Referring to FIG. 4, there is shown a timing flowchart diagram of a third embodiment of the communication controlling system 1 according to the present invention. The transceiver 12 firstly transmits a connection request to the transceiver 22 of the base station 20 to enter a connection setup communication procedure. The processor 14 of the wireless apparatus 10 initiates a connection response window duration after the connection request is transmitted by the transceiver 12. The transceiver 22 of the base station 20 transmits a temporary connection reject signal to the transceiver 12 of the wireless apparatus 10 during the connection response window duration. The temporary connection reject signal carries a first waiting duration. The first waiting duration is determined by the base station 20 according to at least one parameter. The at least one parameter can be used to determine the status of the base station 20 and/or the EPC network 30 or determine a time duration after which the base station 20 and/or the EPC network 30 will turn into the loadable status. Besides, the at least one parameter may be a time arrangement that can prevent some other wireless apparatus from transmitting a retransmitted connection request to the base station 20 at the same time as the wireless apparatus 10. In other words, if a plurality of wireless apparatuses contend to set up connections simultaneously and one of the base station 20 and the EPC network 30 is unable to set up connections with all these wireless apparatuses at the same time, then the base station 20 allocates waiting durations of different time lengths to the wireless apparatuses respectively so that the wireless apparatuses transmit retransmitted connection requests at different times respectively.

The wireless apparatus 10 enters the first waiting duration after the temporary connection reject signal is received by the transceiver 12, and enters a temporary waiting status during the first waiting duration so that the wireless apparatus 10 stays in the connection setup communication procedure in the temporary waiting status. Further speaking, the first waiting duration in this embodiment is a power-saving duration, and the temporary waiting status is a power-saving status. The wireless apparatus 10 leaves from the power-saving status when the first waiting duration expires. Next, the transceiver 12 waits for a connection setup signal from the base station 20 during a duration $\Delta T$ after the first waiting duration so that the wireless apparatus 10 sets up a connection with the base station 20. It shall be appreciated that the duration $\Delta T$ is a duration from expiration of the first waiting duration to expiration of the connection response window duration. If the transceiver 12 does not receive the connection setup signal from the base station 20 yet during the duration $\Delta T$, then the transceiver 12 transmits a retransmitted connection request to the transceiver 22 of the base station 20 when the duration $\Delta T$ expires.

Figure 5:
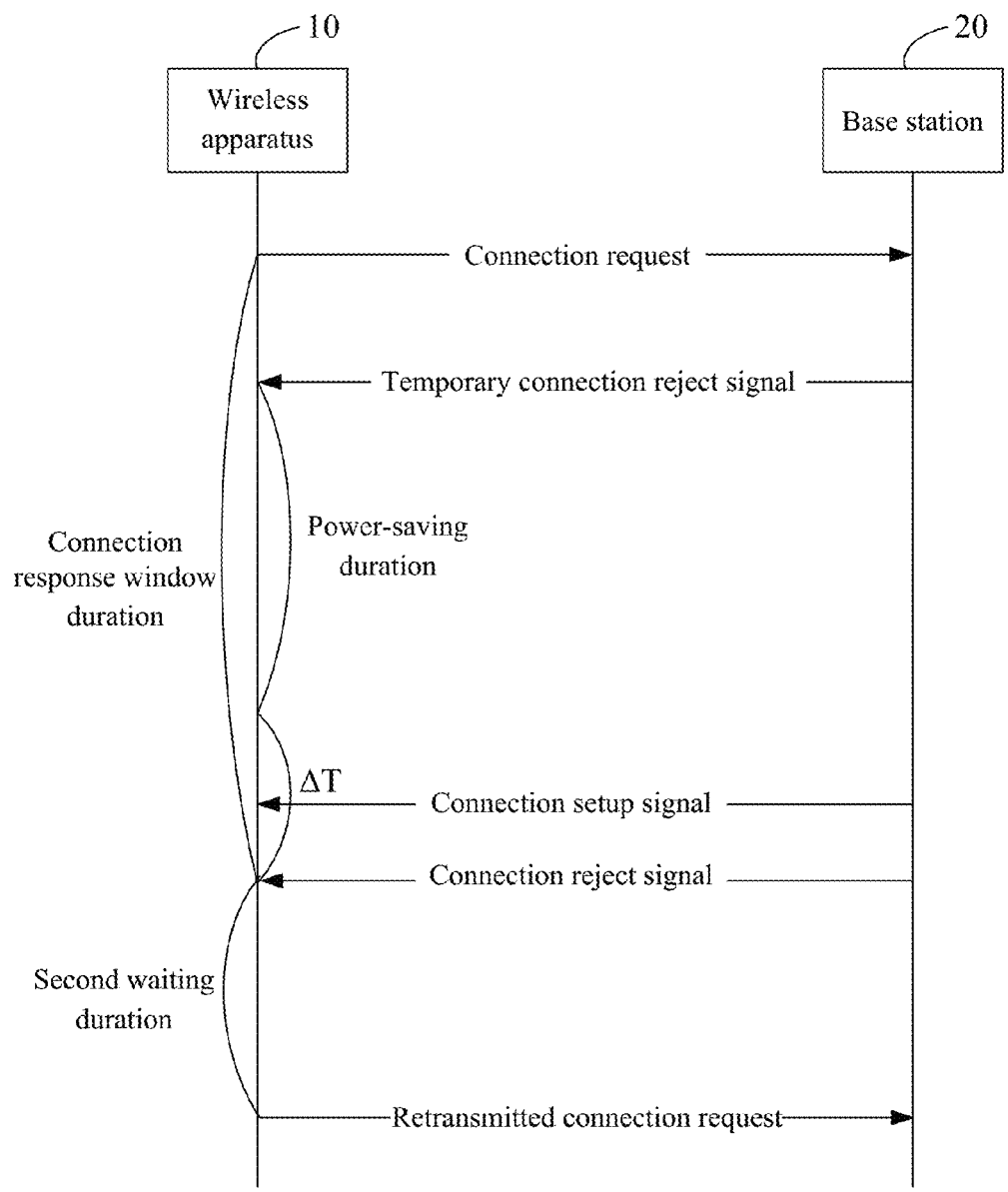
FIG. 5 is a timing flowchart diagram of a fourth embodiment of the communication controlling system according to the present invention.

Referring to FIG. 5, a fourth embodiment of the present invention is an extension of the third embodiment. This embodiment differs from the third embodiment in operations performed during and after the duration $\Delta T$. In this embodiment, the transceiver 22 of the base station 20 does not transmit the connection setup signal during the duration $\Delta T$ and transmits a connection reject signal to the transceiver 12 of the wireless apparatus 10 when the duration $\Delta T$ expires (i.e., when the connection response window duration expires), and the connection reject signal carries a second waiting duration. In this case, the processor 14 of the wireless apparatus 10 initiates the second waiting duration so that the wireless apparatus 10 is kept in the temporary waiting status during the second waiting duration. The transceiver 12 of the wireless apparatus 10 further transmits a retransmitted connection request to the transceiver 22 of the base station 20 when the second waiting duration expires.

The second waiting duration is determined by the base station 20 according to at least one parameter. The at least one parameter can be used to determine the status of the base station 20 and/or the EPC network 30 or determine a time duration after which both the base station 20 and the EPC network 30 will turn into the loadable status. In addition, the at least one parameter may be a time arrangement that can prevent some other wireless apparatus from transmitting a retransmitted connection request to the base station 20 at the same time as the wireless apparatus 10. In other words, if a plurality of wireless apparatuses contend to set up connections simultaneously and one of the base station 20 and the EPC network 30 is unable to set up connections with all these wireless apparatuses at the same time, then the base station 20 allocates waiting durations of different time lengths to the wireless apparatuses respectively so that the wireless apparatuses transmit retransmitted connection requests at different times respectively.

Figure 6:
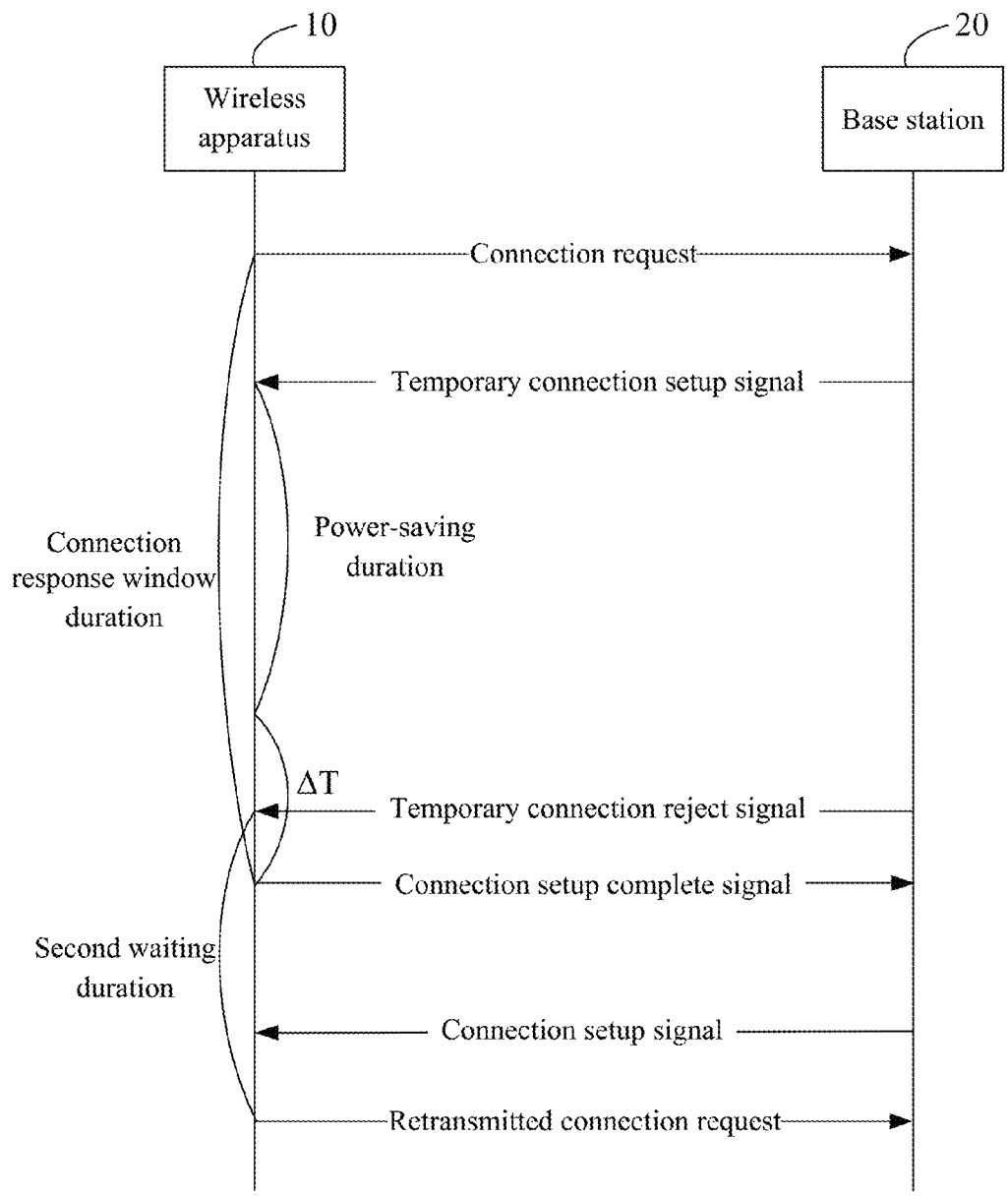
FIG. 6 is a timing flowchart diagram of a fifth embodiment of the communication controlling system according to the present invention.

Referring to FIG. 6, there is shown a timing flowchart diagram of a fifth embodiment of the communication controlling system 1 according to the present invention. The transceiver 12 of the wireless apparatus 10 firstly transmits a connection request to the transceiver 22 of the base station 20 to enter a connection setup communication procedure. The processor 14 of the wireless apparatus 10 initiates a connection response window duration after the connection request is transmitted by the transceiver 12. The transceiver 22 of the base station 20 transmits a first temporary signal to the transceiver 12 of the wireless apparatus 10 during the connection response window duration. The first temporary signal is a temporary connection setup signal and carries a first waiting duration. The wireless apparatus 10 enters the first waiting duration after the first temporary signal is received by the transceiver 12 thereof, and enters a temporary waiting status during the first waiting duration so that the wireless apparatus 10 stays in the connection setup communication procedure in the temporary waiting status. In this embodiment, the first waiting duration is a power-saving duration, and the temporary waiting status is a power-saving status.

The wireless apparatus 10 recovers from the power-saving status when the first waiting duration expires, and the transceiver 12 thereof waits for a second temporary signal from the base station 20 during a duration $\Delta T$ after the first waiting duration. The duration $\Delta T$ is a duration from expiration of the first waiting duration to expiration of the connection response window duration, and the second temporary signal is a temporary connection reject signal. In order to clearly illustrate the signal transmissions in this embodiment, different implementations (A), (B) will be described respectively hereinbelow.

Firstly, the implementation (A) is described. If the transceiver 12 of the wireless apparatus 10 does not receive the second temporary signal during the duration $\Delta T$, it means that the base station 20 and the EPC network 30 are each in the loadable status. Then, the transceiver 12 of the wireless apparatus 10 transmits a connection setup complete signal to the transceiver 22 of the base station 20 when the connection response window duration expires so that the wireless apparatus 10 sets up a connection with the base station 20.

Next, the implementation (B) is described. Assume that the transceiver 12 of the wireless apparatus 10 receives the second temporary signal carrying a second waiting duration during the duration $\Delta T$. Then, the processor 14 of the wireless apparatus 10 initiates the second waiting duration so that the wireless apparatus 10 is kept in the temporary waiting status during the second waiting duration so as to wait for a connection setup signal from the transceiver 22 of the base station 20. Further speaking, if the transceiver 12 of the wireless apparatus 10 does not receive the connection setup signal from the transceiver 22 of the base station 20 during the second waiting duration, then the transceiver 12 transmits a retransmitted connection request to the transceiver 22 of the base station 20 when the second waiting duration expires. Alternatively, if the transceiver 12 of the wireless apparatus 10 receives the connection setup signal from the transceiver 22 of the base station 20 during the second waiting duration, then the transceiver 12 transmits a connection setup complete signal to the transceiver 22 of the base station 20.

Figure 7:
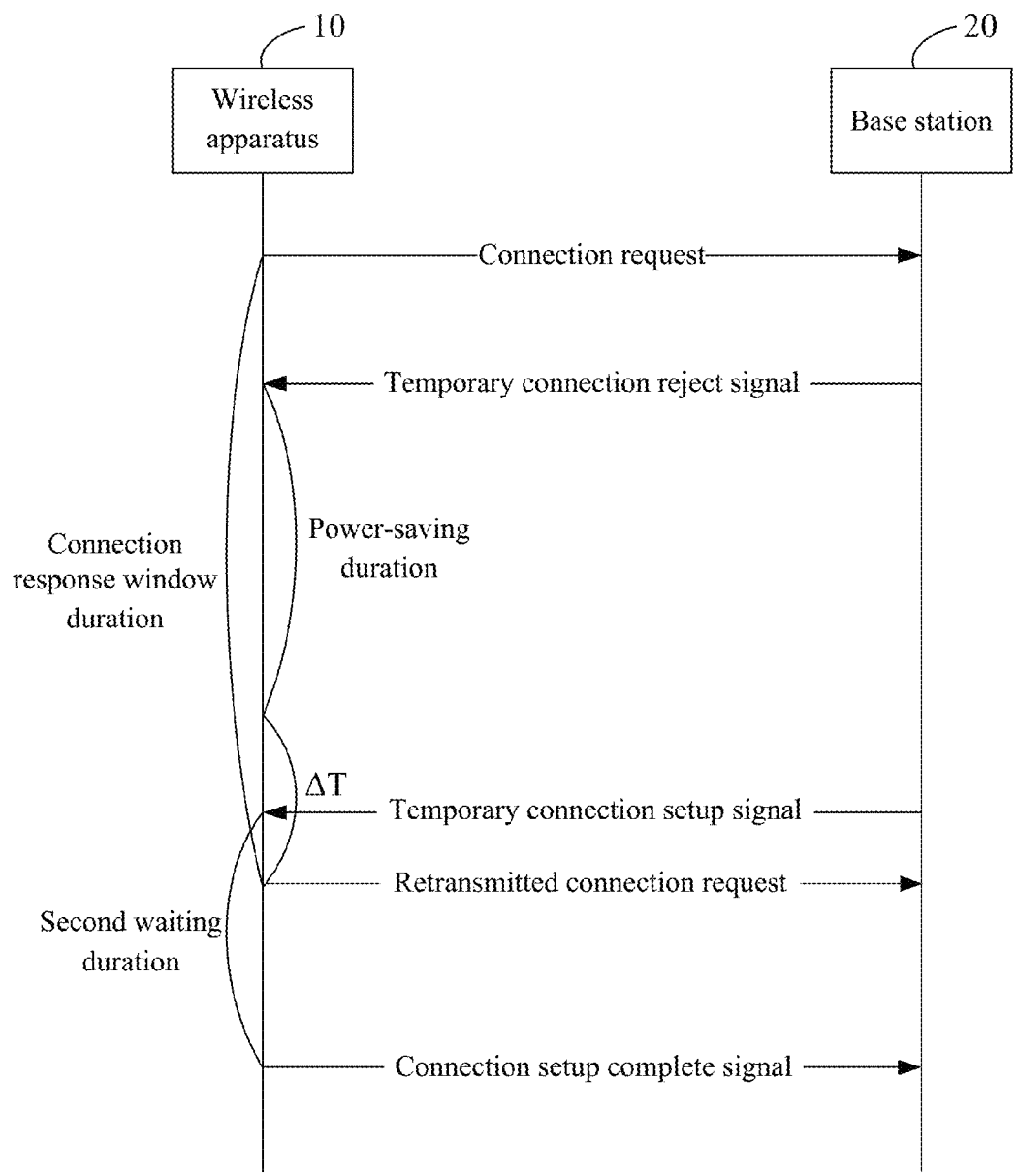
FIG. 7 is a timing flowchart diagram of a sixth embodiment of the communication controlling system according to the present invention.

Referring to FIG. 7, there is shown a timing flowchart diagram of a sixth embodiment of the communication controlling system 1 according to the present invention. The transceiver 12 of the wireless apparatus 10 firstly transmits a connection request to the transceiver 22 of the base station 20 to enter a connection setup communication procedure. The processor 14 of the wireless apparatus 10 initiates a connection response window duration after the connection request is transmitted by the transceiver 12. The transceiver 22 of the base station 20 transmits a first temporary signal to the transceiver 12 of the wireless apparatus 10 during the connection response window duration. The first temporary signal is a temporary connection reject signal and carries a first waiting duration. The wireless apparatus 10 enters the first waiting duration after the first temporary signal is received by the transceiver 12 thereof, and enters a temporary waiting status during the first waiting duration so that the wireless apparatus 10 stays in the connection setup communication procedure in the temporary waiting status. In this embodiment, the first waiting duration is a power-saving duration, and the temporary waiting status is a power-saving status.

The transceiver 12 further waits for a second temporary signal from the transceiver 22 of the base station 20 within a duration $\Delta T$ after the first waiting duration. The duration $\Delta T$ is a duration from expiration of the first waiting duration to expiration of the connection response window duration, and the second temporary signal is a temporary connection setup signal. In order to clearly illustrate the signal transmissions in this embodiment, different implementations (A), (B), and (C) will be described respectively hereinbelow.

Firstly, the implementation (A) is described. If the transceiver 12 of the wireless apparatus 10 does not receive the second temporary signal during the duration $\Delta T$, then the transceiver 12 transmits a retransmitted connection request to the transceiver 22 of the base station 20 when the connection response window duration expires. Next, the implementation (B) is described. If the transceiver 12 of the wireless apparatus 10 receives a second temporary signal carrying a second waiting duration from the base station 20 during the duration $\Delta T$, then the second waiting duration will be initiated. If the transceiver 12 of the wireless apparatus 10 does not receive a connection reject signal during the second waiting duration (i.e., the connection is not rejected by the base station 20 formally), then the processor 14 of the wireless apparatus 10 will take the second temporary signal as a formal connection setup signal (i.e., the transceiver 12 of the wireless apparatus 10 does not need to receive a connection setup signal from the transceiver 22 of the base station 20 again). The transceiver 12 of the wireless apparatus 10 further transmits a connection setup complete signal to the transceiver 22 of the base station 20 when the second waiting duration expires. Then, the transceiver 22 of the base station 20 receives the connection setup complete signal and sets up a connection with the wireless apparatus 10.

In another case, the transceiver 12 of the wireless apparatus 10 does not receive the connection reject signal from the transceiver 22 of the base station 20 during the second waiting duration for reasons such as the transmission of the connection reject signal fails. In this case, the processor 24 of the base station 20 transmits a connection release signal to the transceiver 12 of the wireless apparatus 10 so that the wireless apparatus 10 exits from the connection setup communication procedure after receiving the connection release signal.

Figure 8:
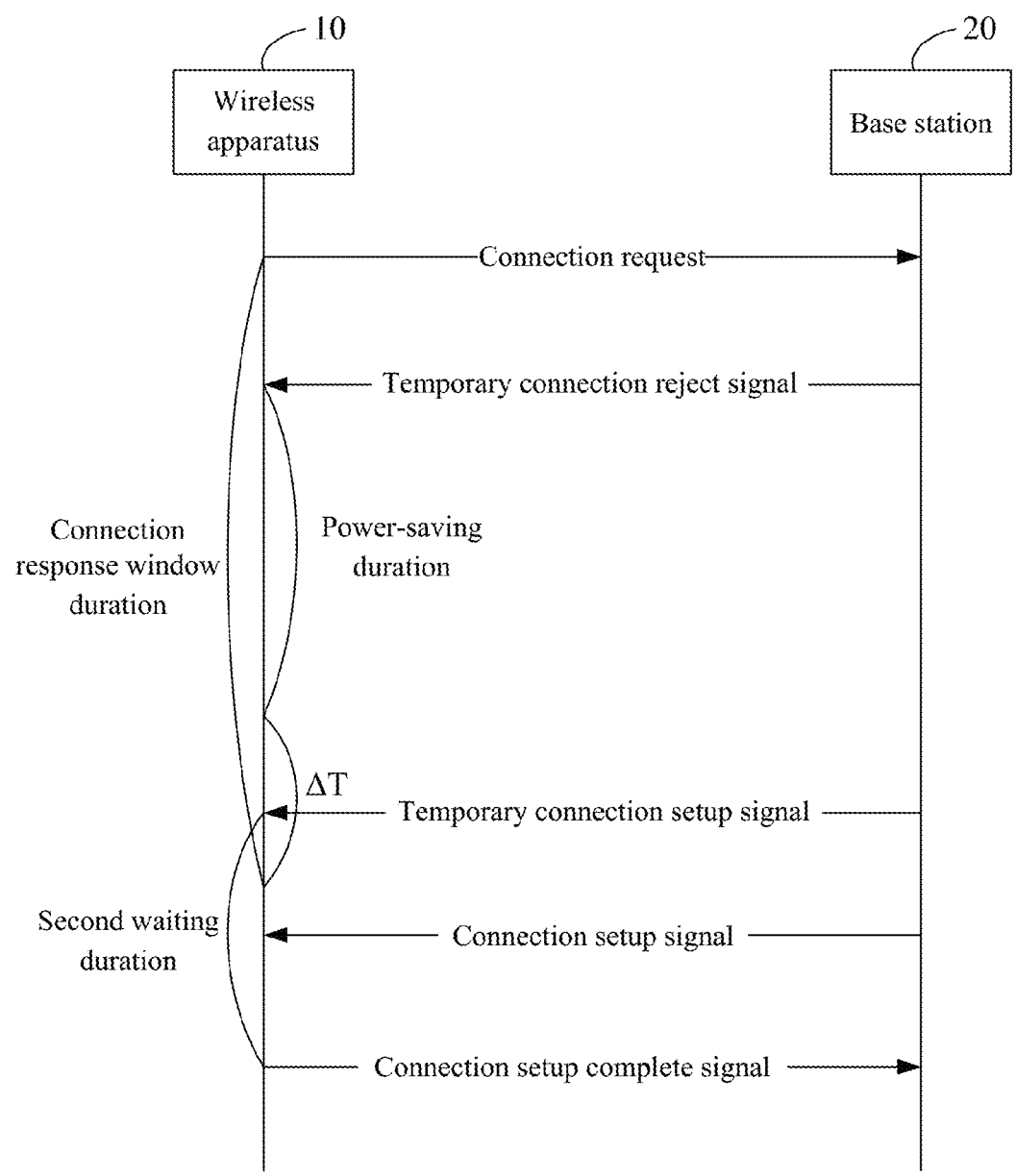
FIG. 8 is a timing flowchart diagram of another implementation of the sixth embodiment of the communication controlling system according to the present invention.

Referring to FIG. 8, there is shown another implementation (C) of the sixth embodiment according to the present invention. FIG. 8 differs from FIG. 7 in operations performed during the second waiting duration. Specifically, the transceiver 12 of the wireless apparatus 10 in this implementation receives a second temporary signal from the transceiver 22 of the base station 20 during the duration $\Delta T$. The second temporary signal is a temporary connection setup signal and carries a time length of the second waiting duration. The processor 14 of the wireless apparatus 10 initiates the second waiting duration, and the transceiver 12 of the wireless apparatus 10 receives a connection setup signal from the transceiver 22 of the base station 20 during the second waiting duration. Then, the transceiver 12 of the wireless apparatus 10 transmits a connection setup complete signal to the transceiver 22 of the base station 20 and sets up a connection with the base station 20.

Figure 9:
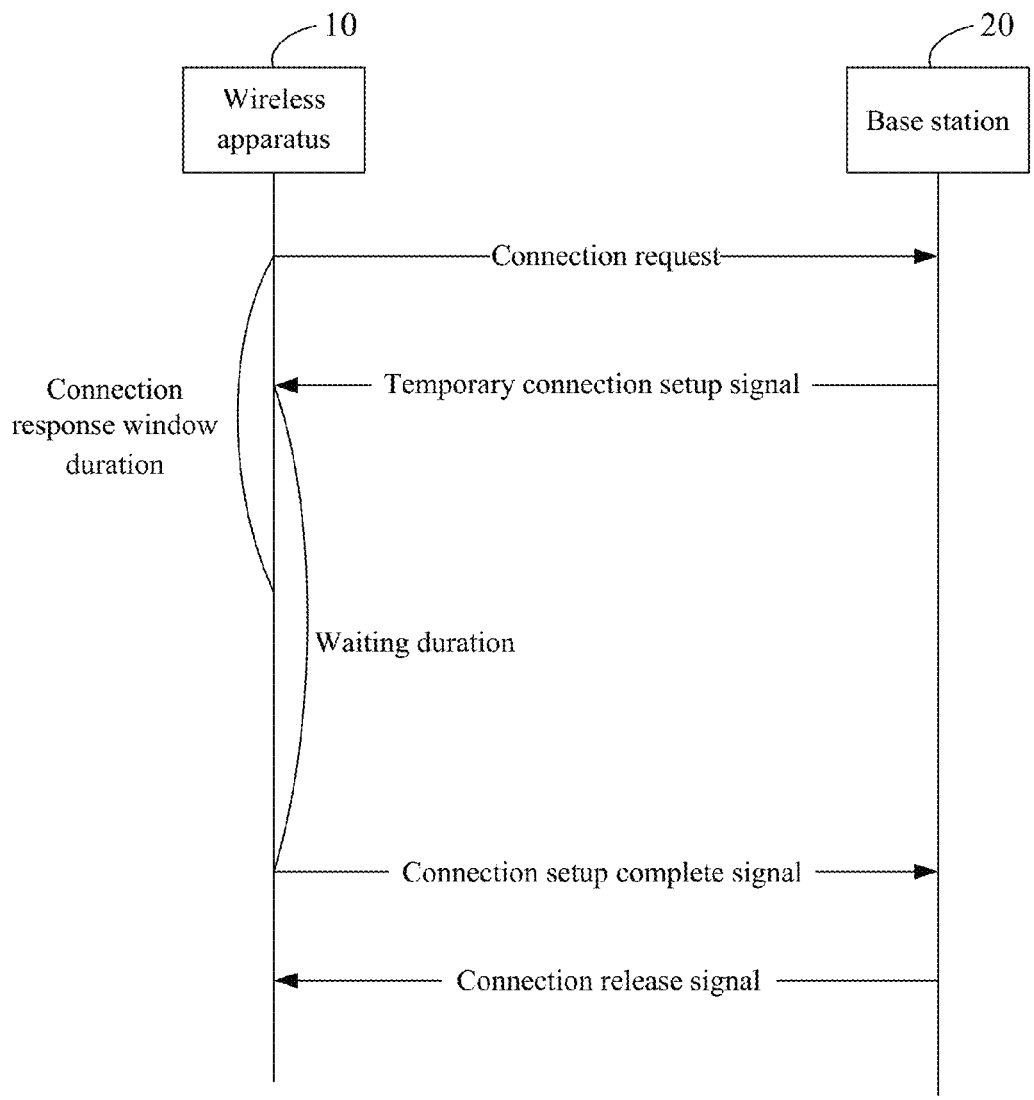
FIG. 9 is a timing flowchart diagram of a seventh embodiment of the communication controlling system according to the present invention.

Referring to FIG. 9, there is shown a timing flowchart diagram of a seventh embodiment of the communication controlling system 1 according to the present invention. The transceiver 12 of the wireless apparatus 10 firstly transmits a connection request to the base station 20 to enter a connection setup communication procedure. The processor 14 of the wireless apparatus 10 initiates a connection response window duration after the connection request is transmitted by the transceiver 12. The transceiver 22 of the base station 20 transmits a temporary connection setup signal to the transceiver 12 of the wireless apparatus 10 during the connection response window duration, and the temporary connection setup signal carries a waiting duration. The processor 14 of the wireless apparatus 10 initiates the waiting duration after the temporary connection setup signal is received. The wireless apparatus 10 enters a temporary waiting status during the waiting duration so that the wireless apparatus 10 stays in the connection setup communication procedure in the temporary waiting status. The transceiver 12 transmits a connection setup complete signal to the transceiver 22 of the base station 20 when the waiting duration expires. If the base station 20 or the EPC network 30 is still in the overload status when the connection setup complete signal is received, then the transceiver 22 of the base station 20 transmits a connection release signal to the transceiver 12 of the wireless apparatus 10. On the other hand, if the base station 20 and the EPC network 30 are in the loadable status when the connection setup complete signal is received, then the base station 20 sets up a connection with the wireless apparatus 10 according to the connection setup complete signal from the transceiver 12 of the wireless apparatus 10.

Figure 10:
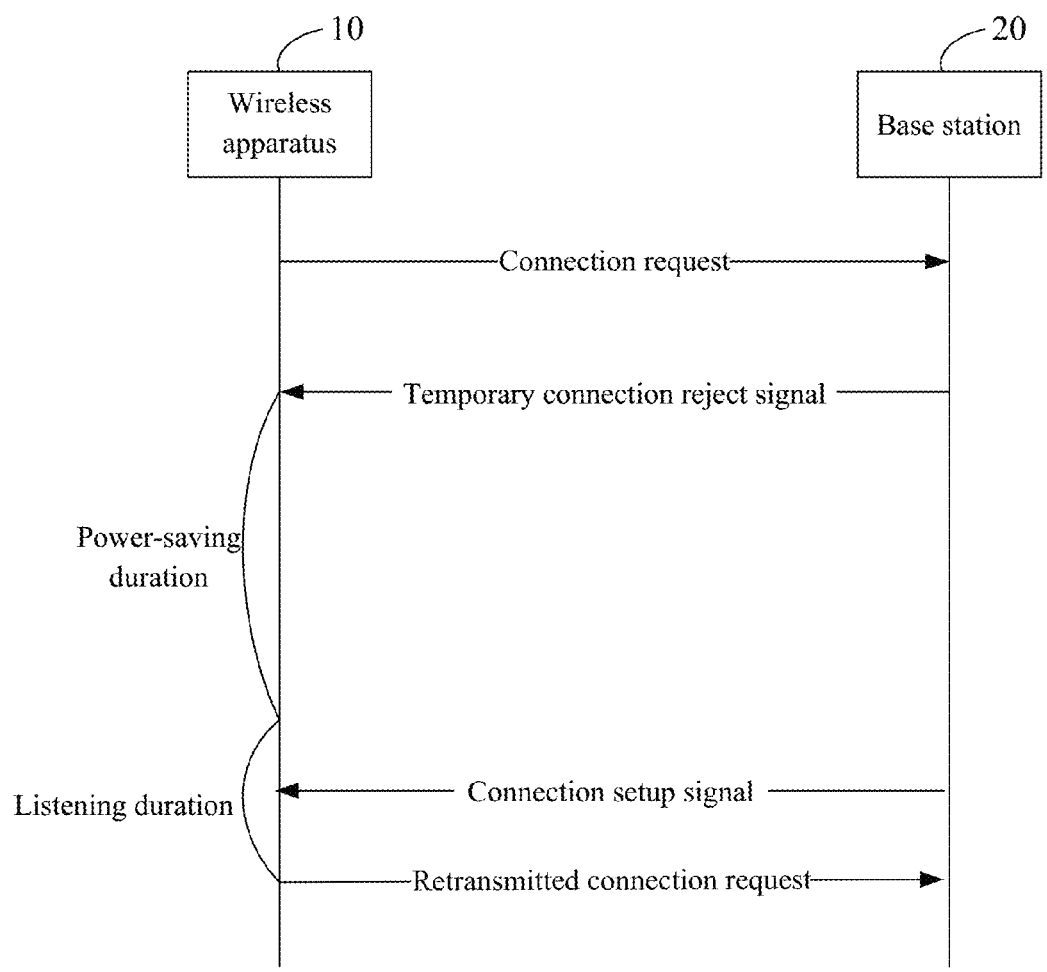
FIG. 10 is a timing flowchart diagram of an eighth embodiment of the communication controlling system according to the present invention.

Referring next to FIG. 10, there is shown a timing flowchart diagram of an eighth embodiment of the communication controlling system 1 according to the present invention. The transceiver 12 of the wireless apparatus 10 firstly transmits a connection request to the transceiver 22 of the base station 20 to enter a connection setup communication procedure. Because the base station 20 or the EPC network 30 is in the overload status when the connection request is transmitted by the wireless apparatus 10, the transceiver 22 of the base station 20 transmits a temporary connection reject signal to the transceiver 12 of the wireless apparatus 10. The transceiver 12 of the wireless apparatus 10 enters a first waiting duration after receiving the temporary connection reject signal. The wireless apparatus 10 enters a temporary waiting status during the first waiting duration so that the transceiver 12 thereof stays in the connection setup communication procedure in the temporary waiting status. In this embodiment, the first waiting duration is a power-saving duration, and the temporary waiting status is a power-saving status. The power-saving duration and a listening duration may be carried in the temporary connection reject signal transmitted from the transceiver 22 of the base station 20, or may be preset by the wireless apparatus 10. The transceiver 12 of the wireless apparatus 10 waits for a connection setup signal from the transceiver 22 of the base station 20 during the listening duration after the first waiting duration.

Further speaking, if the transceiver 12 of the wireless apparatus 10 does not receive the connection setup signal from the transceiver 22 of the base station 20 during the listening duration after the first waiting duration, then the transceiver 12 transmits a retransmitted connection request to the transceiver 22 of the base station 20 when the listening duration expires. On the other hand, if the transceiver 12 of the wireless apparatus 10 receives the connection setup signal from the transceiver 22 of the base station 20 during the listening duration after the first waiting duration, then the transceiver 12 transmits a connection setup complete signal (not shown) to the transceiver 22 of the base station 20.

Figure 11:
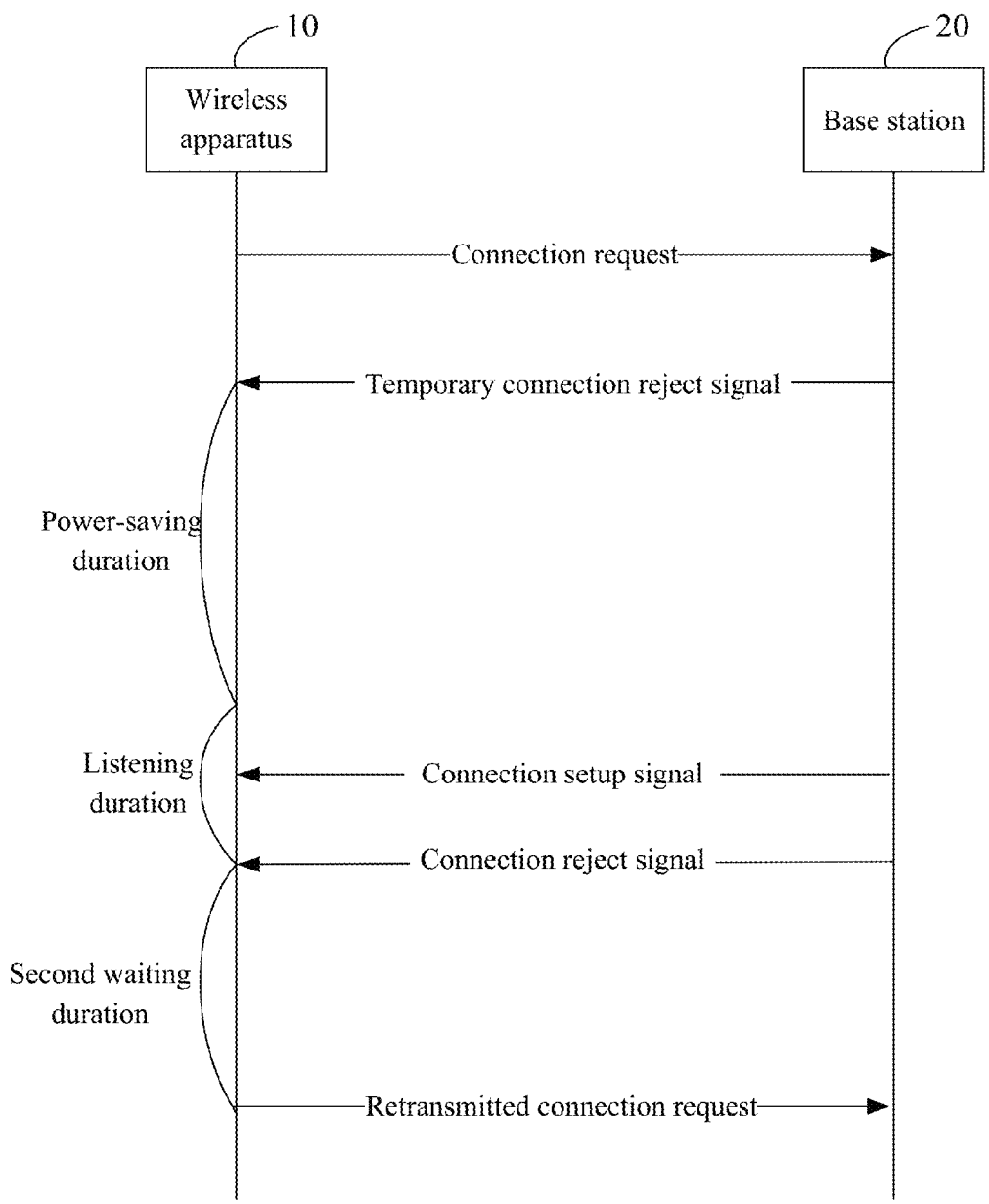
FIG. 11 is a timing flowchart diagram of a ninth embodiment of the communication controlling system according to the present invention.

Referring to FIG. 11, there is shown a timing flowchart diagram of a ninth embodiment of the communication controlling system 1 according to the present invention. The ninth embodiment is an extension of the eighth embodiment but differs from the eighth embodiment in that: the transceiver 12 of the wireless apparatus 10 does not receive the connection setup signal during the listening duration and receives a connection reject signal from the transceiver 22 of the base station 20 when the listening duration expires, and the connection reject signal carries a second waiting duration. The processor 14 of the wireless apparatus 10 initiates the second waiting duration when the listening duration expires. The transceiver 12 transmits a retransmitted connection request to the transceiver 22 of the base station 20 when the second waiting duration expires.

It shall be further appreciated that in the aforesaid embodiments, if the base station 20 determines that the base station 20 or the EPC network 30 is in the overload status but is possibly to set up a connection with the wireless apparatus 10 later when the transceiver 12 of the wireless apparatus 10 is waiting to transmit a connection setup complete signal to or is waiting for a connection setup signal from the transceiver 22 of the base station 20, then the transceiver 22 of the base station 20 transmits a postpone signal to the wireless apparatus 10. The transceiver 12 of the wireless apparatus 10 will wait a third waiting duration according to the postpone signal after receiving the postpone signal. Thereby, the time length of the waiting duration of the wireless apparatus 10 is prolonged so that the wireless apparatus 10 stays in the connection setup communication procedure to wait until the base station 20 and the EPC network 30 restore the loadable status. The third waiting duration may be a default duration of the wireless apparatus 10 or be carried in the postpone signal. If the transceiver 12 of the wireless apparatus 10 has not received the connection setup signal from the base station 20 yet when the third waiting duration expires, then the transceiver 12 transmits a retransmitted connection request to the transceiver 22 of the base station 20.

Figure 12:
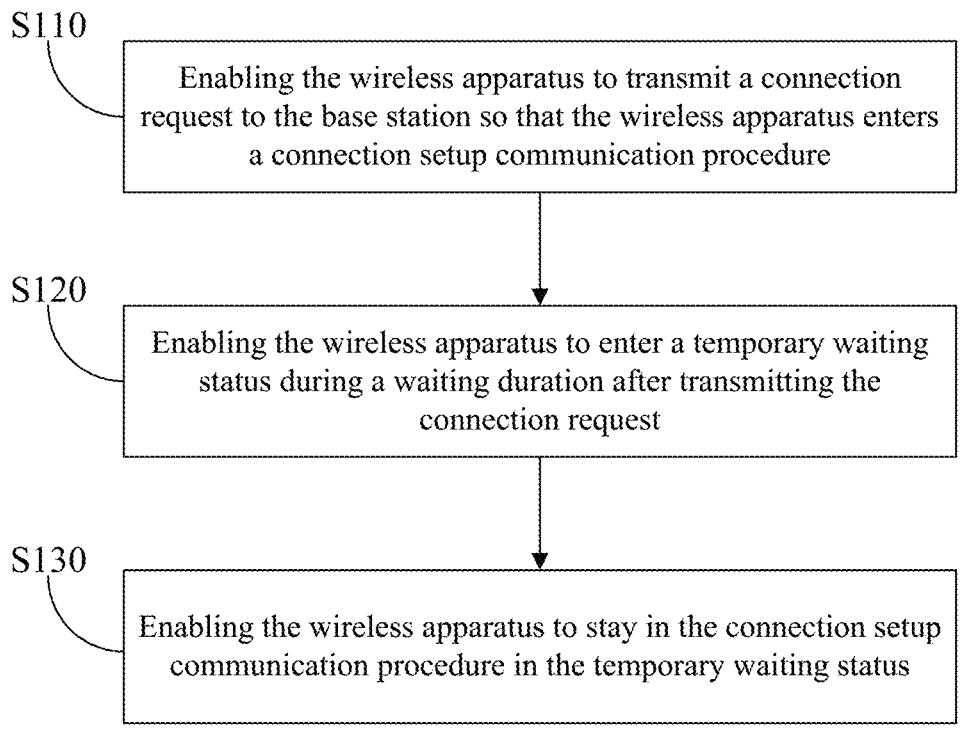
FIG. 12 is a primary flowchart diagram of a communication controlling method according to the present invention.

The present invention further provides a communication controlling method, of which a main flowchart diagram is shown in FIG. 12. The communication controlling method is suitable for use in the aforesaid network communication controlling system and comprises the following steps. Firstly, step S110 is executed to enable a wireless apparatus to transmit a connection request to a base station so that the wireless apparatus enters a connection setup communication procedure. Next, step S120 is executed to enable the wireless apparatus to enter a temporary waiting status during a waiting duration after transmitting the connection request. Then, step S130 is executed to enable the wireless apparatus to stay in the connection setup communication procedure in the temporary waiting status.

Figure 13:
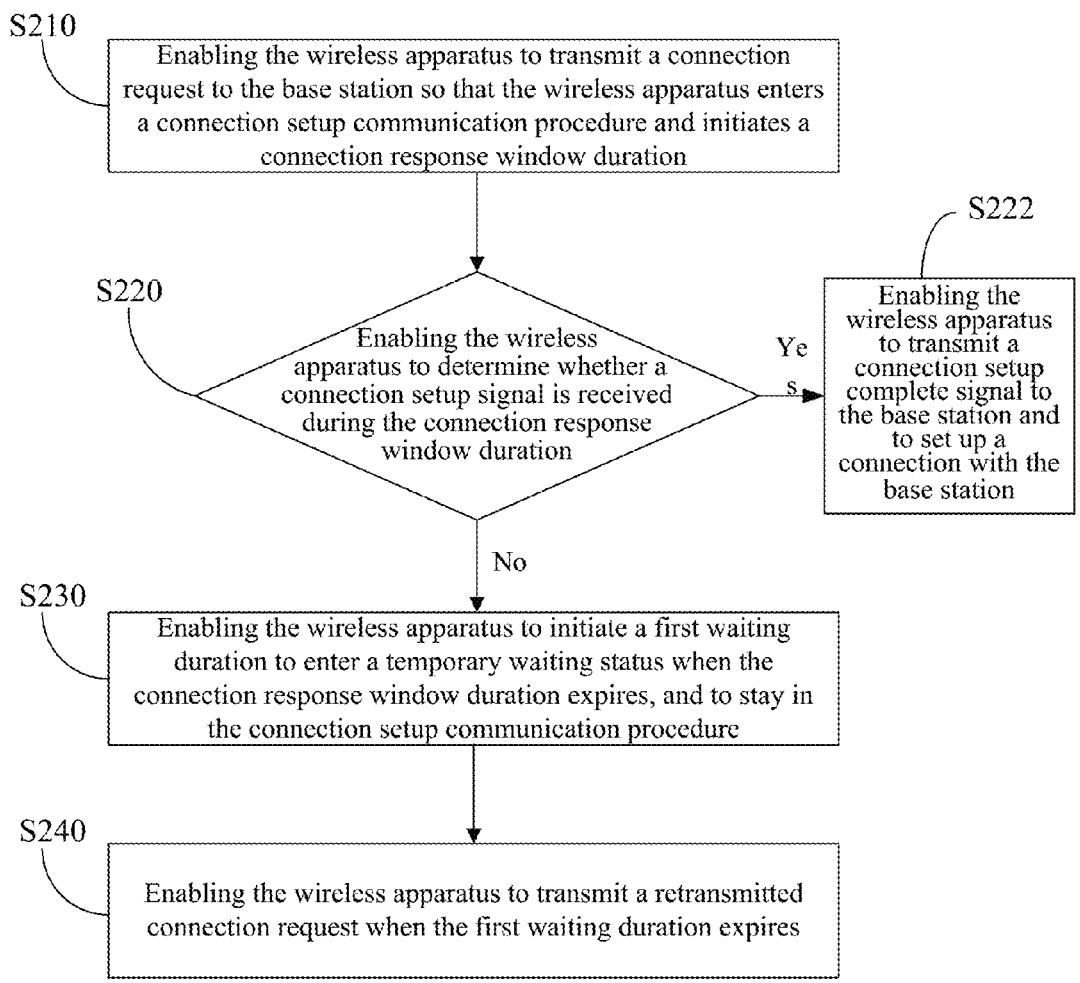
FIG. 13 is a flowchart diagram of a first embodiment of the communication controlling method according to the present invention.

Referring to FIG. 13, there is shown a flowchart diagram of a first embodiment of the communication controlling method according to the present invention. Firstly, step S210 is executed to enable a wireless apparatus to transmit a connection request to a base station so that the wireless apparatus enters a connection setup communication procedure and initiates a connection response window duration. Next, step S220 is executed to enable the wireless apparatus to determine whether a connection setup signal is received during the connection response window duration. If the determination result in the step S220 is "yes", then step S222 is executed to enable the wireless apparatus to transmit a connection setup complete signal to the base station and to set up a connection with the base station. Otherwise, if the determination result in the step S220 is "no", then step S230 is executed to enable the wireless apparatus to initiate a first waiting duration so as to enter a temporary waiting status when the connection response window duration expires, and to stay in the connection setup communication procedure. Then, step S240 is executed after the step S230 to enable the wireless apparatus to transmit a retransmitted connection request when the first waiting duration expires.

The first waiting duration is a default duration built in the wireless apparatus, and the wireless apparatus may be in either a power-saving status or a non-power-saving status during the first waiting duration. The so-called "temporary waiting status" is a status in which the wireless apparatus still is waiting to set up a connection with the base station. The so-called "connection setup communication procedure" is a procedure in which the wireless apparatus is going to set up a connection with the base station.

Figure 14:
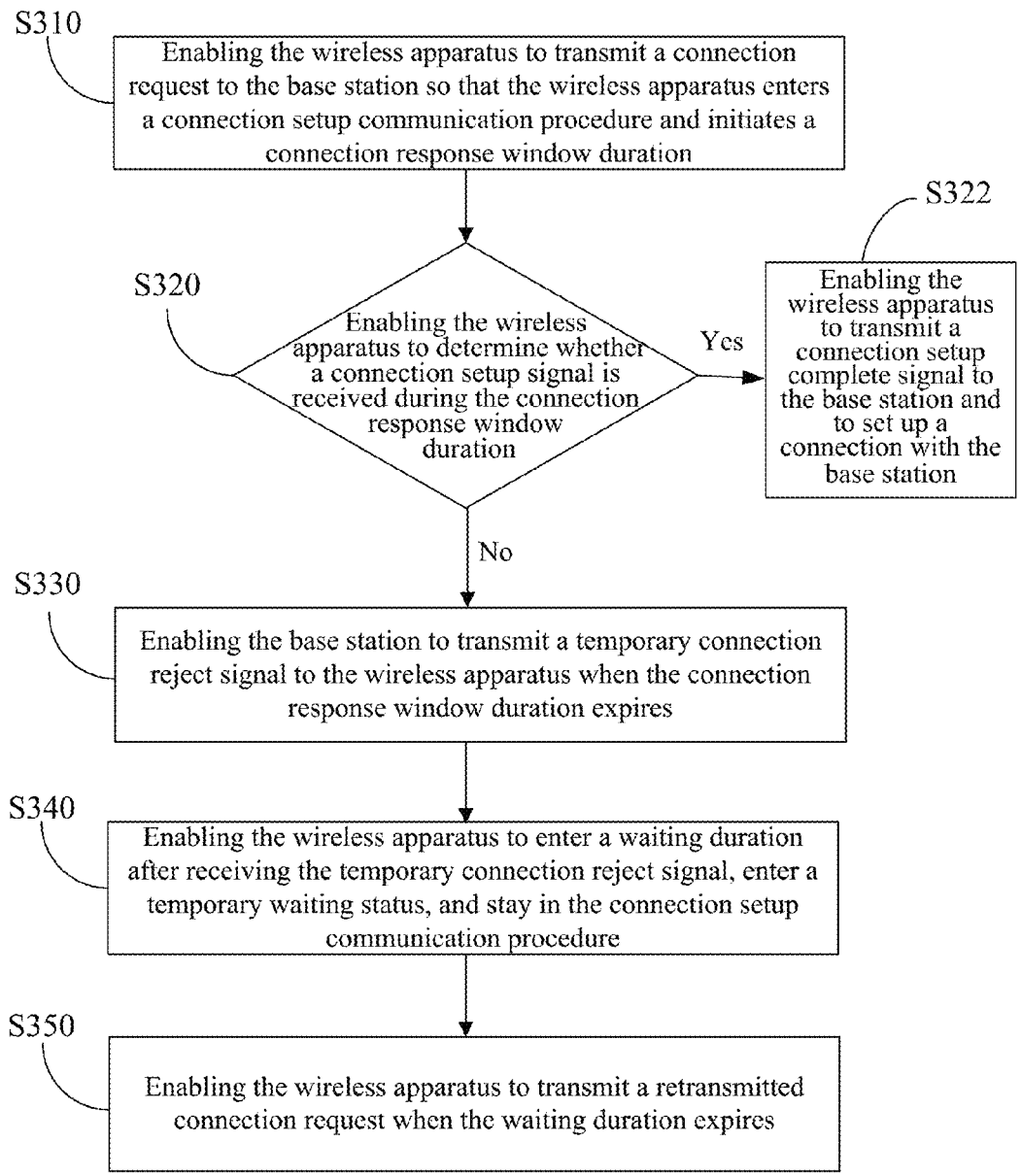
FIG. 14 is a flowchart diagram of a second embodiment of the communication controlling method according to the present invention.

Referring to FIG. 14, there is shown a flowchart diagram of a second embodiment of the communication controlling method according to the present invention. Firstly, step S310 is executed to enable the wireless apparatus to transmit a connection request to the base station so that the wireless apparatus enters a connection setup communication procedure and initiates a connection response window duration. Next, step S320 is executed to enable the wireless apparatus to determine whether a connection setup signal is received during the connection response window duration. If the determination result in the step S320 is "yes", then step S322 is executed to enable the wireless apparatus to transmit a connection setup complete signal to the base station and to set up a connection with the base station. Otherwise, if the determination result in the step S320 is "no", then step S330 is executed to enable the base station to transmit the temporary connection reject signal to the wireless apparatus when the connection response window duration expires. Afterwards, step S340 is executed to enable the wireless apparatus to enter a waiting duration after receiving the temporary connection reject signal, enter a temporary waiting status, and stay in the connection setup communication procedure. Subsequently, step S350 is executed to enable the wireless apparatus to transmit a retransmitted connection request when the waiting duration expires.

Figure 15:
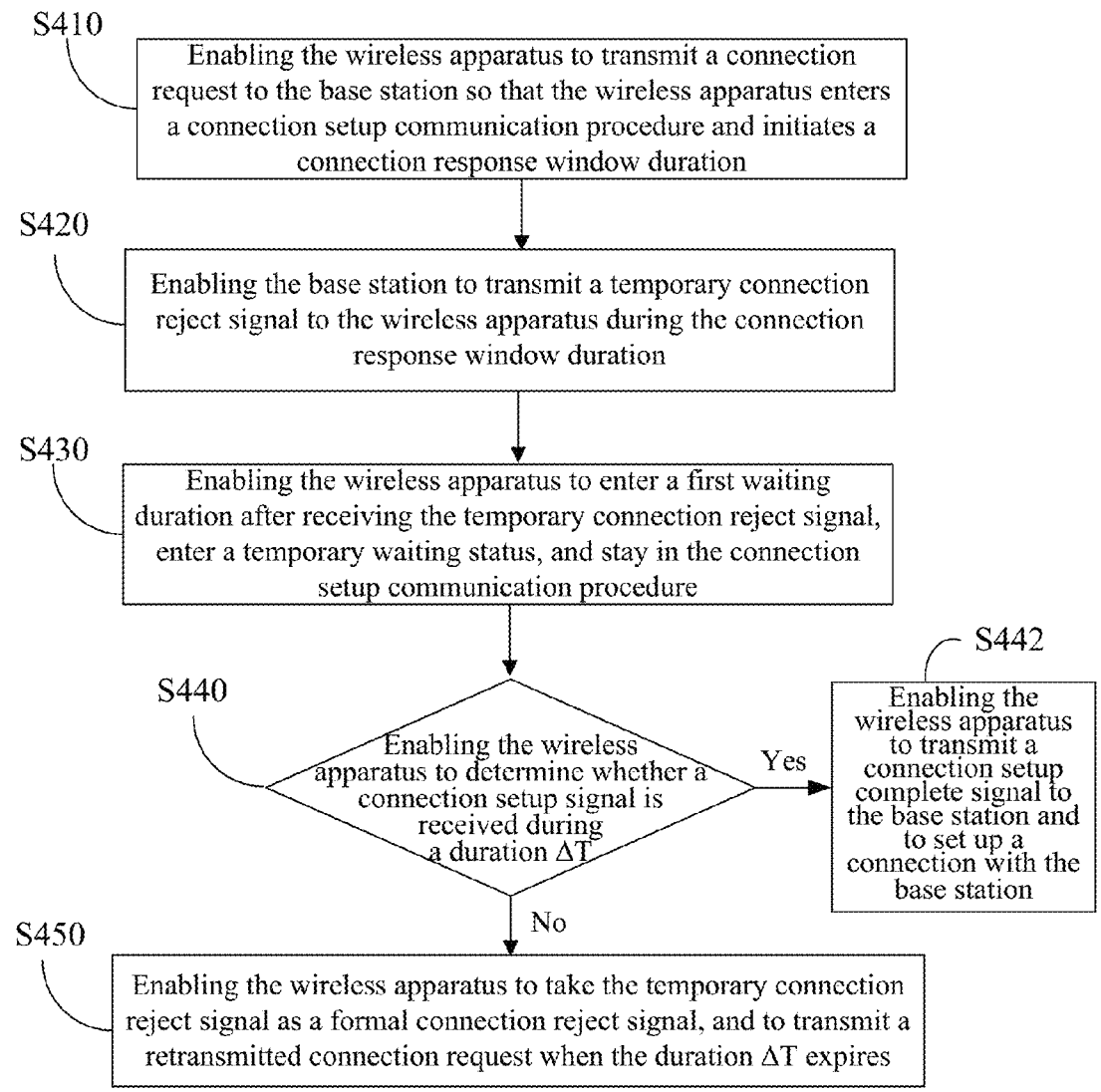
FIG. 15 is a flowchart diagram of a third embodiment of the communication controlling method according to the present invention.

Referring to FIG. 15, there is shown a flowchart diagram of a third embodiment of the communication controlling method according to the present invention. Firstly, step S410 is executed to enable the wireless apparatus to transmit a connection request to the base station so that the wireless apparatus enters a connection setup communication procedure and initiates a connection response window duration. Next, step S420 is executed to enable the base station to transmit a temporary connection reject signal to the wireless apparatus during the connection response window duration. Then, step S430 is executed to enable the wireless apparatus to enter a first waiting duration after receiving the temporary connection reject signal, enter a temporary waiting status, and stay in the connection setup communication procedure. It shall be appreciated that the first waiting duration is a power-saving duration and the temporary waiting status is a power-saving status. Afterwards, step S440 is executed to enable the wireless apparatus to determine whether a connection setup signal is received during a duration $\Delta T$ after the first waiting duration. The duration $\Delta T$ is a duration from expiration of the first waiting duration to expiration of the connection response window duration. It shall be appreciated that the wireless apparatus recovers from the power-saving status when the first waiting duration expires.

If the determination result in the step S440 is "yes", then step S442 is executed to enable the wireless apparatus to transmit a connection setup complete signal to the base station and to set up a connection with the base station. Otherwise, if the determination result in the step S440 is "no", then step S450 is executed to enable the wireless apparatus to take the temporary connection reject signal received in the step S420 as a formal connection reject signal from the base station, and enable the wireless apparatus to transmit a retransmitted connection request when the duration ΔT expires (i.e., when the connection response window duration expires).

Figure 16:
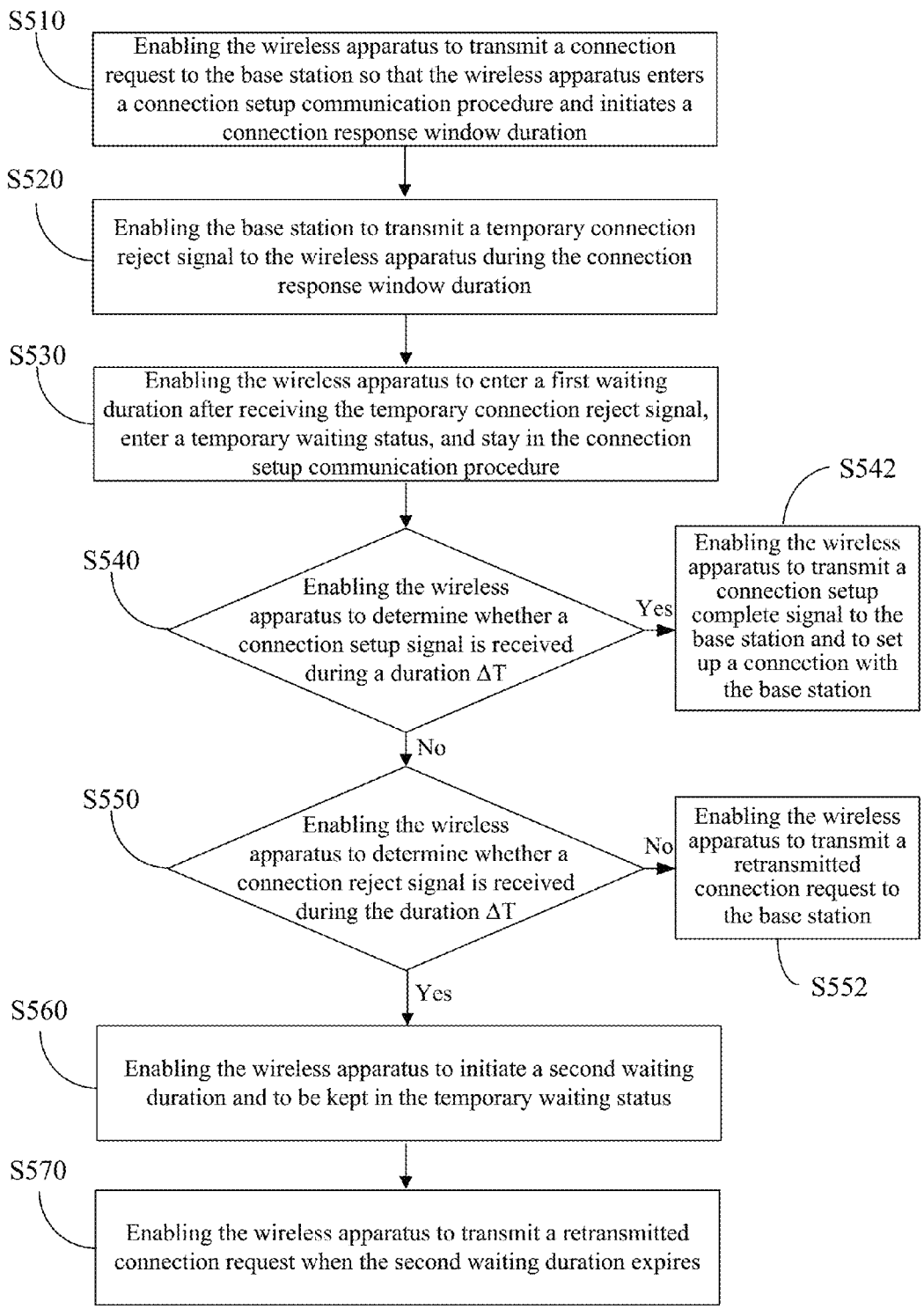
FIG. 16 is a flowchart diagram of a fourth embodiment of the communication controlling method according to the present invention.

Referring to FIG. 16, there is shown a flowchart diagram of a fourth embodiment of the communication controlling method according to the present invention. Steps S510, S520, and S530 in this embodiment are just the same as the steps S410, S420, and S430 in the third embodiment respectively, and thus will not be further described again herein. Step S540 is further executed in the communication controlling method according to this embodiment to enable the wireless apparatus to determine whether a connection setup signal is received during a duration ΔT. The duration ΔT is a duration from expiration of the first waiting duration to expiration of the connection response window duration. If the determination result in the step S540 is "yes", then step S542 is executed to enable the wireless apparatus to transmit a connection setup complete signal to the base station and to set up a connection with the base station. Otherwise, if the determination result in the step S540 is "no", then step S550 is executed to enable the wireless apparatus to determine whether a connection reject signal from the base station is received during the duration ΔT. If the determination result in the step S550 is "no", then step S552 is executed to enable the wireless apparatus to transmit a retransmitted connection request to the base station. Otherwise, if the determination result in the step S550 is "yes", then step S560 is executed to enable the wireless apparatus to initiate a second waiting duration and to be kept in the temporary waiting status. Then, step S570 is further executed after the step S560 to enable the wireless apparatus to transmit the retransmitted connection request when the second waiting duration expires.

Figure 17:
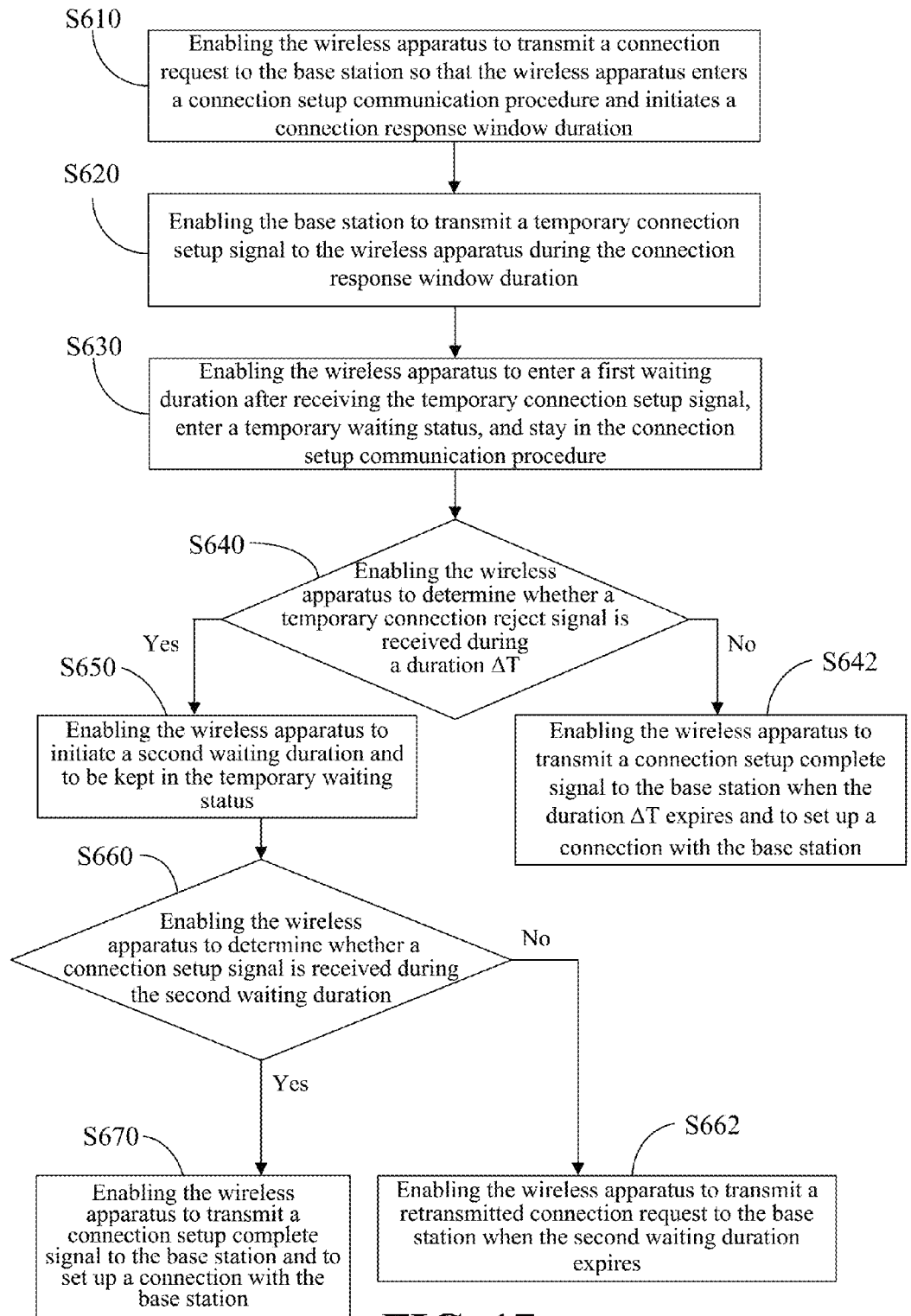
FIG. 17 is a flowchart diagram of a fifth embodiment of the communication controlling method according to the present invention.

Referring to FIG. 17, there is shown a flowchart diagram of a fifth embodiment of the communication controlling method according to the present invention. Firstly, step S610 is executed in the communication controlling method to enable the wireless apparatus to transmit a connection request to the base station so that the wireless apparatus enters a connection setup communication procedure and initiates a connection response window duration. Next, step S620 is executed to enable the base station to transmit a temporary connection setup signal to the wireless apparatus during the connection response window duration. Then, step S630 is executed to enable the wireless apparatus to enter a first waiting duration after receiving the temporary connection setup signal, and to enter a temporary waiting status during the first waiting duration so that the wireless apparatus stays in the connection setup communication procedure. Afterwards, step S640 is executed to enable the wireless apparatus to determine whether a temporary connection reject signal from the base station is received during a duration ΔT. The duration ΔT is a duration from expiration of the first waiting duration to expiration of the connection response window duration.

If the determination result in the step S640 is "no", then step S642 is executed to enable the wireless apparatus to transmit a connection setup complete signal to the base station when the connection response window duration expires, and to set up a connection with the base station. Otherwise, if the determination result in the step S640 is "yes", then step S650 is executed to enable the wireless apparatus to initiate a second waiting duration so that the wireless apparatus is kept in the temporary waiting status during the second waiting duration. Then, step S660 is executed after the step S650 to enable the wireless apparatus to determine whether a connection setup signal is received during the second waiting duration. If the determination result in the step S660 is "no", then step S662 is executed to enable the wireless apparatus to transmit a retransmitted connection request to the base station when the second waiting duration expires. Otherwise, if the determination result in the step S660 is "yes", then step S670 is executed to enable the wireless apparatus to transmit a connection setup complete signal to the base station so that the wireless apparatus sets up a connection with the base station.

Figure 18A:
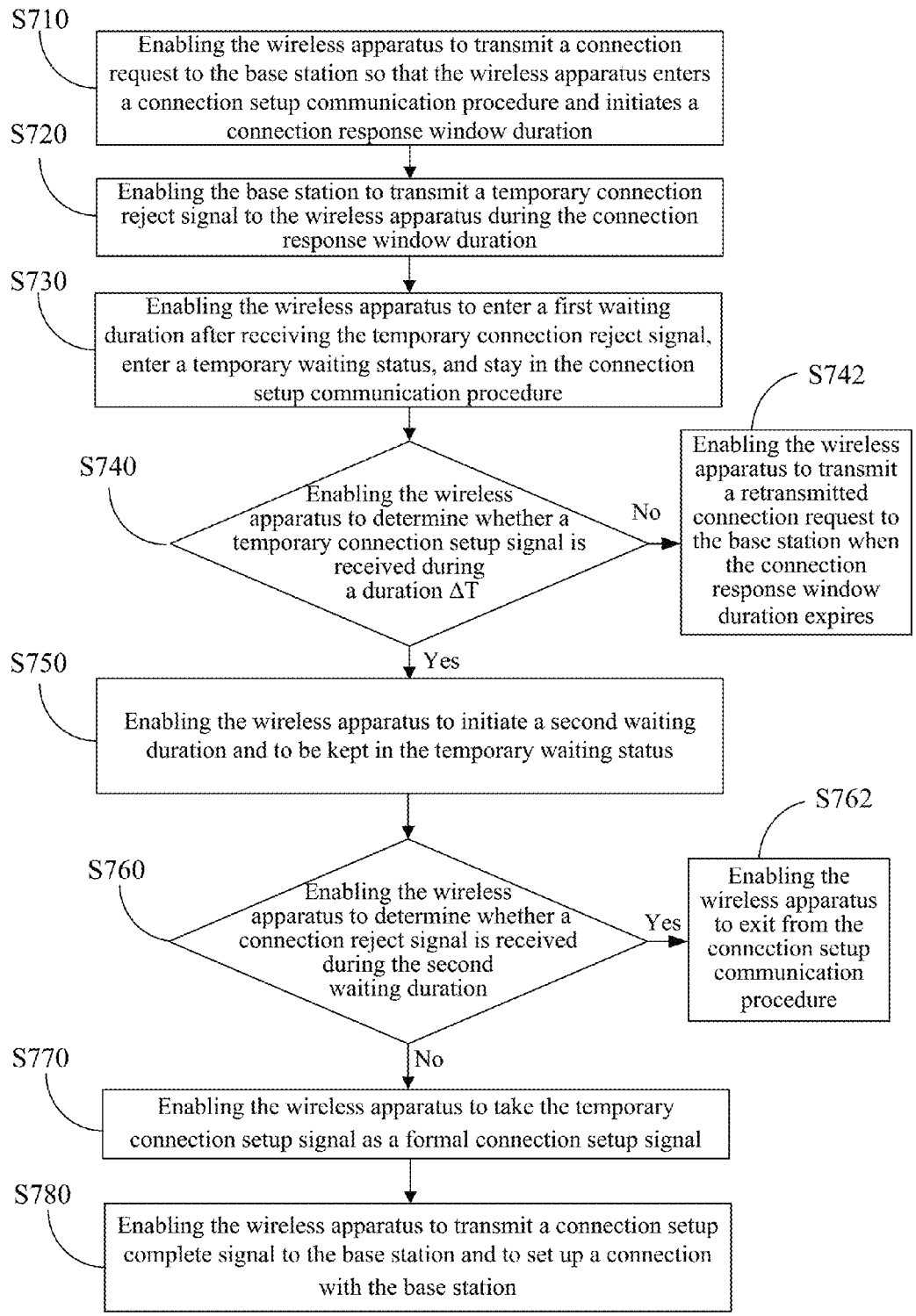
FIG. 18A is a flowchart diagram of a sixth embodiment of the communication controlling method according to the present invention.

Referring to FIG. 18A, there is shown a flowchart diagram of a sixth embodiment of the communication controlling method according to the present invention. Firstly, step S710 is executed in the communication controlling method to enable the wireless apparatus to transmit a connection request to the base station so that the wireless apparatus enters a connection setup communication procedure and initiates a connection response window duration. Next, step S720 is executed to enable the base station to transmit a temporary connection reject signal to the wireless apparatus during the connection response window duration. Then, step S730 is executed to enable the wireless apparatus to enter a first waiting duration after receiving the temporary connection reject signal, and to enter a temporary waiting status during the first waiting duration so as to stay in the connection setup communication procedure. Afterwards, step S740 is executed to enable the wireless apparatus to determine whether a second temporary signal is received during a duration ΔT.

The duration ΔT is a duration from expiration of the first waiting duration to expiration of the connection response window duration, and the second temporary signal is a temporary connection setup signal.

If the determination result in the step S740 is "no", then step S742 is executed to enable the wireless apparatus to transmit a retransmitted connection request to the base station when the connection response window duration expires. Otherwise, if the determination result in the step S740 is "yes", then step S750 is executed to enable the wireless apparatus to initiate a second waiting duration and to be kept in the temporary waiting status during the second waiting duration, and stay in the connection setup communication procedure. Then, step S760 is executed after the step S750 to enable the wireless apparatus to determine whether a connection reject signal is received during the second waiting duration.

If the determination result in the step S760 is "yes", then step S762 is executed to enable the wireless apparatus to exit from the connection setup communication procedure. Otherwise, if the determination result in the step S760 is "no", then step S770 is executed to enable the wireless apparatus to take the temporary connection setup signal as a formal connection setup signal. Then, step S780 is executed after the step S770 to enable the wireless apparatus to transmit a connection setup complete signal to the base station and to set up a connection with the base station.

In another case, the wireless apparatus does not receive the connection reject signal during the second waiting duration for reasons such as the transmission of the connection reject signal fails. In such a case, a step may be executed in the communication controlling method to enable the base station to transmit a connection release signal to the wireless apparatus so that a further step is executed to enable the wireless apparatus to exit from the connection setup communication procedure after receiving the connection release signal.

Further speaking, if the determination result in the step S760 is "no" in the aforesaid implementation of the sixth embodiment, then another implementation in which the wireless apparatus does not take the temporary connection setup signal as a formal connection setup signal may be further obtained as an extension. Then, when the wireless apparatus waits to transmit a connection setup complete signal to the base station after the step S760, a step may be executed to enable the base station to determine whether the base station or the EPC network is in the overload status. If the determination result in this step is "yes", then another step is further executed to enable the base station to transmit a postpone signal to the wireless apparatus so that the wireless apparatus is kept in the temporary waiting status and stays in the connection setup communication procedure. The postpone signal carries a third waiting duration. Then, a further step is executed to enable the wireless apparatus to initiate the third waiting duration after receiving the postpone signal, and to transmit a retransmitted connection request to the base station when the third waiting duration expires.

Figure 18B:
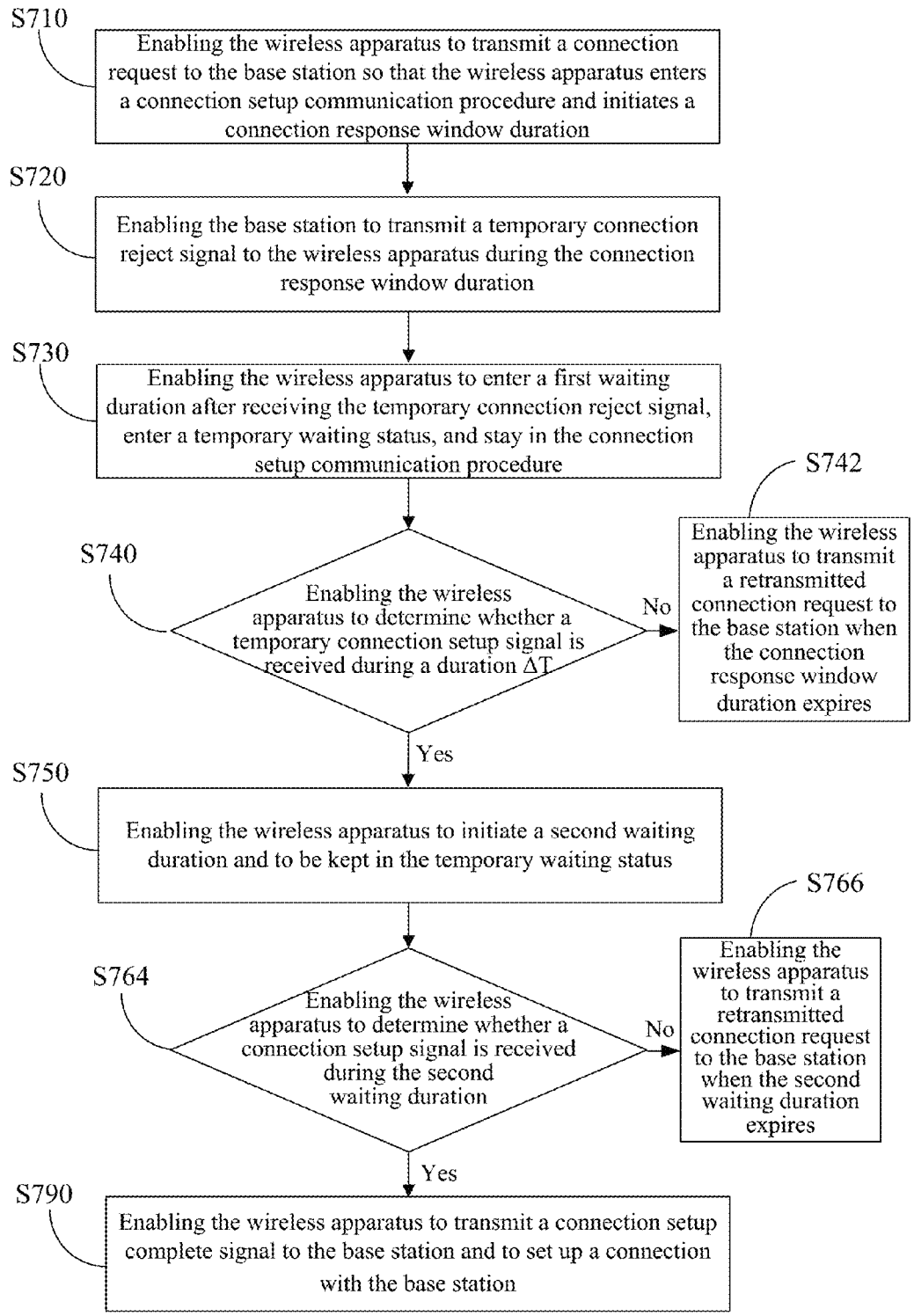
FIG. 18B is a flowchart diagram of another implementation of the sixth embodiment of the communication controlling method according to the present invention.

Referring to FIG. 18B, there is shown a flowchart diagram of another implementation of the sixth embodiment of the communication controlling method according to the present invention. This implementation differs from the previous implementation in operations performed after the step S750. Specifically, step S764 is further executed after the step S750 to enable the wireless apparatus to determine whether a connection setup signal is received during the second waiting duration. If the determination result in the step S764 is "no", then step S766 is executed to enable the wireless apparatus to transmit a retransmitted connection request to the base station when the second waiting duration expires. Otherwise, if the determination result in the step S764 is "yes", then step S790 is executed to enable the wireless apparatus to transmit a connection setup complete signal to the base station and to set up a connection with the base station.

Further speaking, another implementation of the sixth embodiment may be further obtained as an extension. Specifically, when the wireless apparatus waits to transmit a connection setup signal to the base station after the step S764, a step may be executed to enable the base station to determine whether the base station or the EPC network is in the overload status. If the determination result in this step is "yes", then another step is further executed to enable the base station to transmit a postpone signal to the wireless apparatus so that the wireless apparatus is kept in the temporary waiting status and stays in the connection setup communication procedure. The postpone signal carries a third waiting duration. Then, a further step is executed to enable the wireless apparatus to initiate the third waiting duration after receiving the postpone signal, and to transmit a retransmitted connection request to the base station when the third waiting duration expires.

Figure 19:
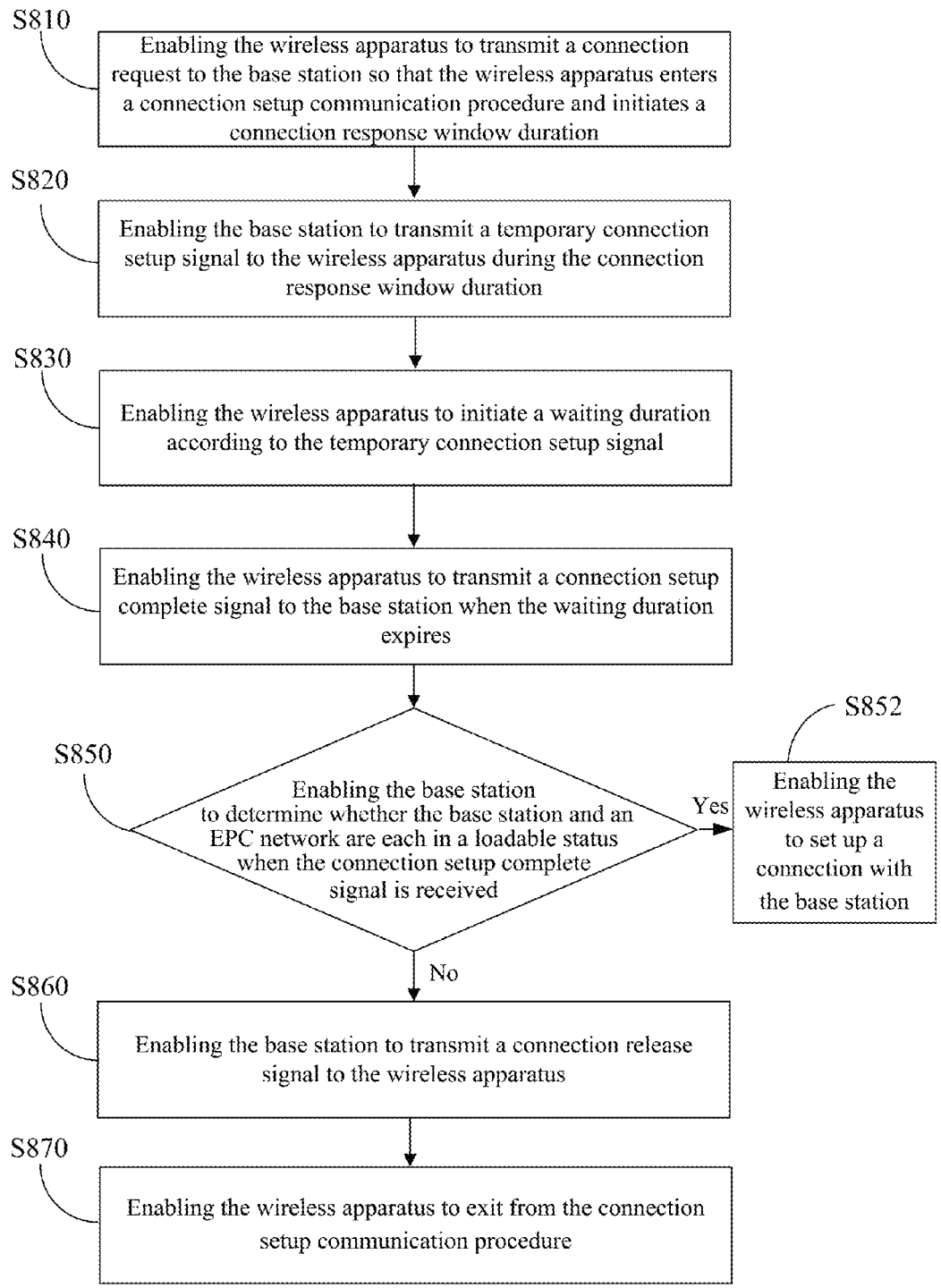
FIG. 19 is a flowchart diagram of a seventh embodiment of the communication controlling method according to the present invention.

Referring to FIG. 19, there is shown a flowchart diagram of a seventh embodiment of the communication controlling method according to the present invention. Firstly, step S810 is executed to enable the wireless apparatus to transmit a connection request to the base station so that the wireless apparatus enters a connection setup communication procedure and initiates a connection response window duration. Next, step S820 is executed to enable the base station to transmit a temporary connection setup signal to the wireless apparatus during the connection response window duration. The temporary connection setup signal carries a waiting duration. Then, step S830 is executed to enable the wireless apparatus to initiate the waiting duration carried in the temporary connection setup signal after receiving the temporary connection setup signal. Afterwards, step S840 is executed to enable the wireless apparatus to transmit a connection setup complete signal to the base station when the waiting duration expires. Subsequently, step S850 is executed to enable the base station to determine whether the base station and the EPC network are in the loadable status when the connection setup complete signal is received.

If the determination result in the step S850 is "yes", then step S852 is executed to enable the wireless apparatus to set up a connection with the base station. Otherwise, if the determination result in the step S850 is "no", then step S860 is executed to enable the base station to transmit a connection release signal to the wireless apparatus. Then, step S870 is executed after the step S860 to enable the wireless apparatus to exit from the connection setup communication procedure according to the connection release signal.

Figure 20:
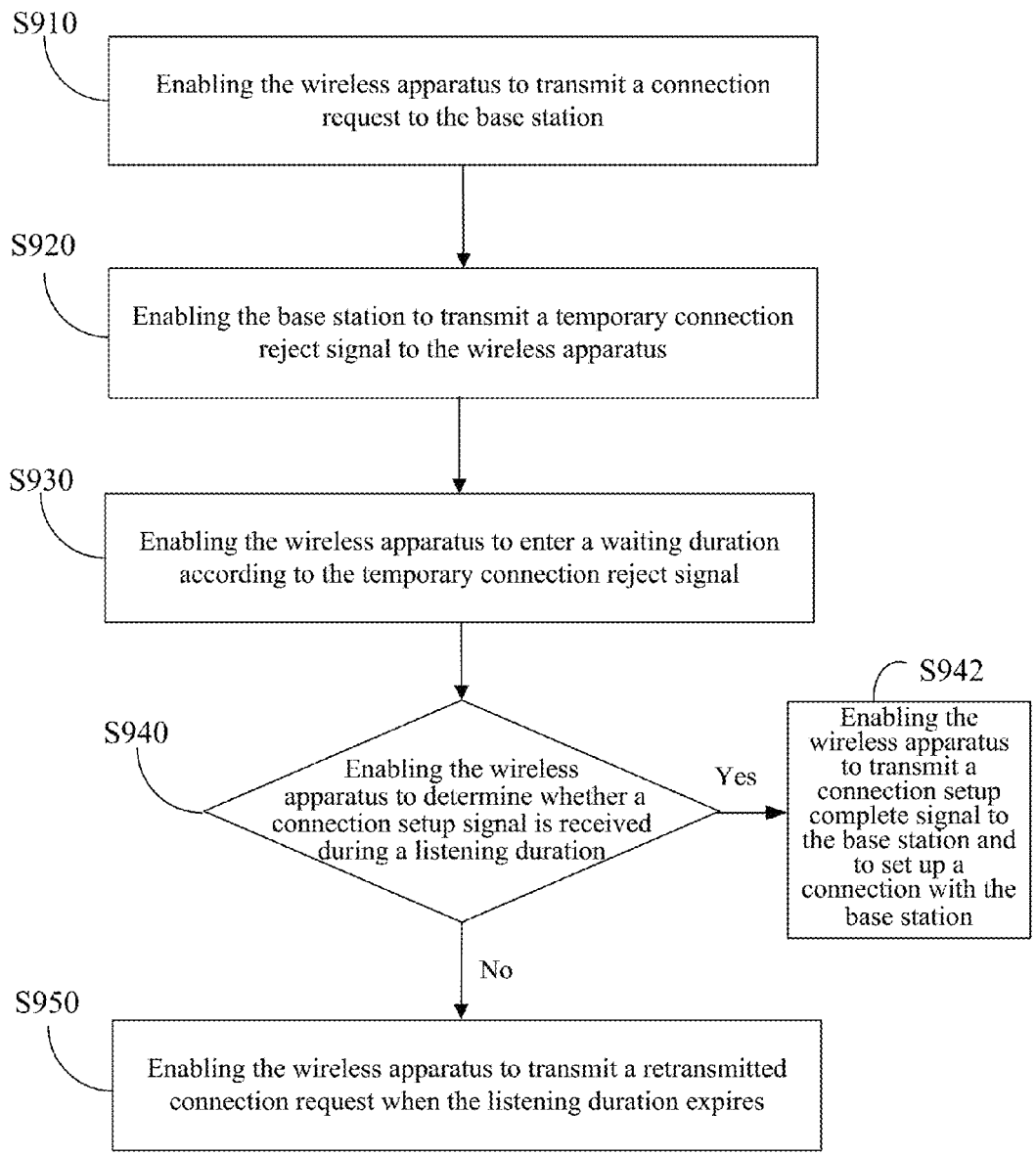
FIG. 20 is a flowchart diagram of an eighth embodiment of the communication controlling method according to the present invention.

Referring to FIG. 20, there is shown a flowchart diagram of an eighth embodiment of the communication controlling method according to the present invention. Firstly, step S910 is executed to enable the wireless apparatus to transmit a connection request to the base station. Next, step S920 is executed to enable the base station to transmit a temporary connection reject signal to the wireless apparatus. Then, step S930 is executed to enable the wireless apparatus to enter a waiting duration after receiving the temporary connection reject signal. Afterwards, step S940 is executed to enable the wireless apparatus to determine whether a connection setup signal is received during a listening duration after the waiting duration.

If the determination result in the step S940 is "yes", then step S942 is executed to enable the wireless apparatus to transmit a connection setup complete signal to the base station and to set up a connection with the base station. Otherwise, if the determination result in the step S940 is "no", then step S950 is executed to enable the wireless apparatus to transmit a retransmitted connection request when the listening duration expires. It shall be appreciated that the waiting duration and the listening duration may be carried in the temporary connection reject signal transmitted in the step S920 or may each be a default value in this embodiment.

Figure 21:
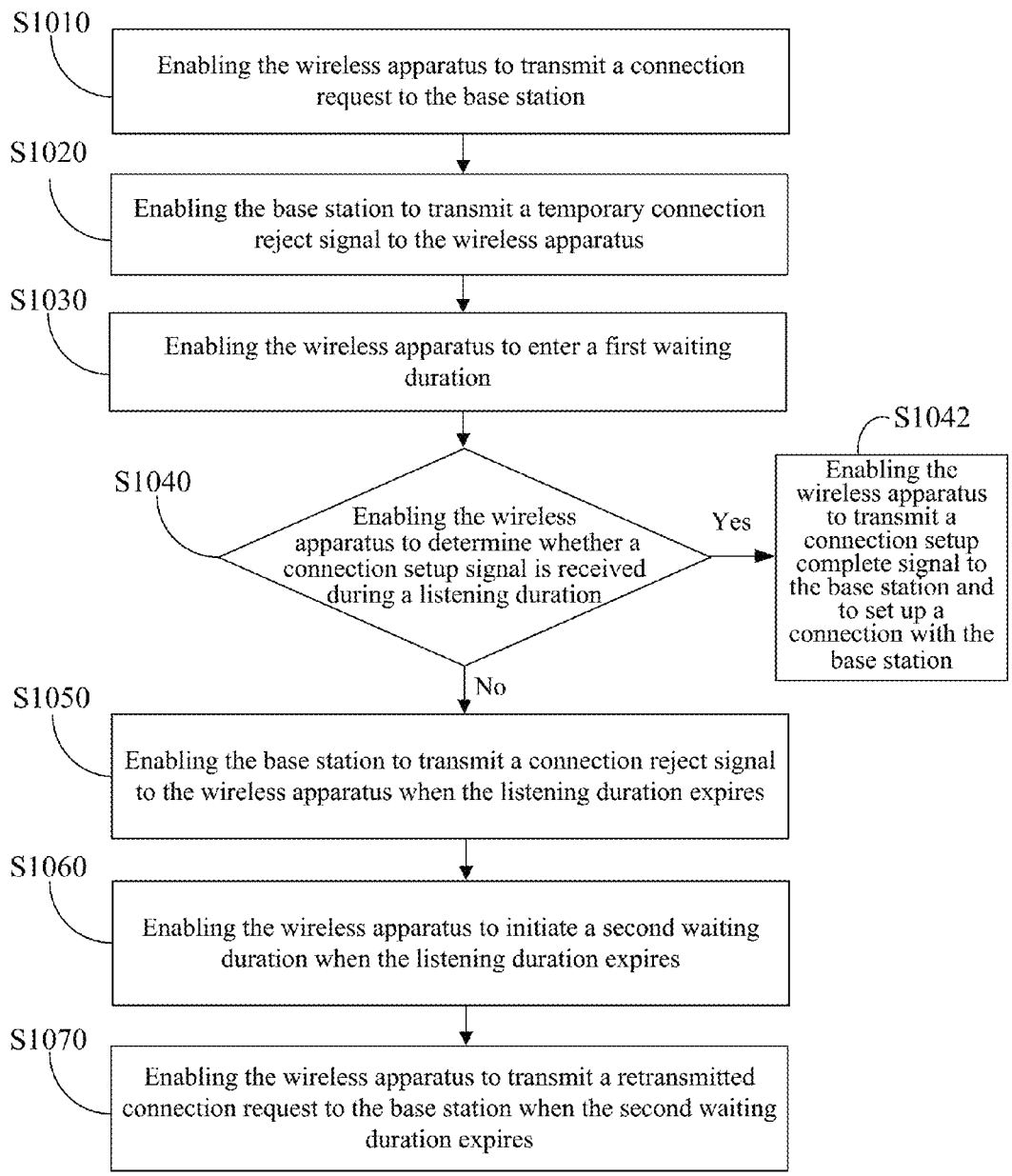
FIG. 21 is a flowchart diagram of a ninth embodiment of the communication controlling method according to the present invention.

Referring to FIG. 21, there is shown a flowchart diagram of a ninth embodiment of the communication controlling method according to the present invention. Firstly, step S1010 is executed in the communication controlling method to enable the wireless apparatus to transmit a connection request to the base station. Next, step S1020 is executed to enable the base station to transmit a temporary connection reject signal to the wireless apparatus. Then, step S1030 is executed to enable the wireless apparatus to enter a first waiting duration. Afterwards, step S1040 is executed to enable the wireless apparatus to determine whether a connection setup signal is received during a listening duration after the first waiting duration.

If the determination result in the step S1040 is "yes", then step S1042 is executed to enable the wireless apparatus to transmit a connection setup complete signal to the base station and to set up a connection with the base station. Otherwise, if the determination result in the step S1040 is "no", then step S1050 is executed to enable the base station to transmit a connection reject signal to the wireless apparatus when the listening duration expires. Then, step S1060 is executed after the step S1050 to enable the wireless apparatus to initiate a second waiting duration when the listening duration expires. Finally, step S1070 is executed to enable the wireless apparatus to transmit a retransmitted connection request to the base station when the second waiting duration expires.

It shall be appreciated that the first waiting duration and the listening duration may be carried in the temporary connection reject signal transmitted in the step S1020 or may each be a default value in this embodiment. The second waiting duration may be a default value.

According to the above descriptions, during the process of setting up a connection between the base station and the wireless apparatus in the communication controlling system according to the present invention, the wireless apparatus determines whether to enter a waiting duration and then enter a temporary waiting status during the waiting duration depending on whether the connection request thereof is replied by the base station and on the signal content replied. The wireless apparatus stays in a connection setup communication procedure in the temporary waiting status. In this way, it is unnecessary for the mobile apparatus to repeat new connection setup communication procedures continuously, so the time for the wireless apparatus and the base station to set up a connection therebetween will not be postponed and an overload status of the base station due to repeatedly receiving a connection request from a same wireless apparatus can be avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless apparatus for use in a communication controlling system, the communication controlling system comprising the wireless apparatus and a base station, the wireless apparatus comprising:
   a transceiver, being configured to transmit a connection request to the base station so that the wireless apparatus enters a connection setup communication procedure and to receive a temporary signal from the base station after transmitting the connection request, wherein the temporary signal carries a first waiting duration; and
   a processor electrically connected to the transceiver, being configured to, after the temporary signal is received by the transceiver, enable the wireless apparatus to enter a temporary waiting status during the first waiting duration so that the wireless apparatus stays in the connection setup communication procedure in the temporary waiting status;
   wherein the connection setup communication procedure is a procedure in which the wireless apparatus is going to set up a connection with the base station.

2. The wireless apparatus as claimed in claim 1, wherein the temporary signal is a temporary connection reject signal, and the processor initiates a connection response window duration after the connection request is transmitted by the transceiver, the transceiver does not receive a connection setup signal from the base station during the connection response window duration and receives the temporary connection reject signal from the base station when the connection response window duration expires, the wireless apparatus enters the first waiting duration after the temporary connection reject signal is received by the transceiver, and the transceiver further transmits a retransmitted connection request to the base station when the first waiting duration expires.

3. The wireless apparatus as claimed in claim 1, wherein the temporary signal is a temporary connection reject signal, and the processor initiates a connection response window duration after the connection request is transmitted by the transceiver, the transceiver receives the temporary connection reject signal from the base station during the connection response window duration, the wireless apparatus enters the first waiting duration after the temporary connection reject signal is received by the transceiver, the temporary waiting status of the wireless apparatus in the first waiting duration is a power-saving status, the wireless apparatus further recovers from the power-saving status when the first waiting duration expires, and the transceiver further waits for a connection setup signal from the base station after the first waiting duration has expired but before the connection response window duration expires.

4. The wireless apparatus as claimed in claim 3, wherein when the transceiver does not receive the connection setup signal after the first waiting duration has expired but before the connection response window duration expires and receives a connection reject signal from the base station when the connection response window duration expires, the processor initiates a second waiting duration carried in the connection reject signal so that the wireless apparatus is kept in the temporary waiting status during the second waiting duration, and the transceiver further transmits a retransmitted connection request to the base station when the second waiting duration expires.

5. The wireless apparatus as claimed in claim 1, wherein the temporary signal is a first temporary signal, the processor initiates a connection response window duration after the connection request is transmitted by the transceiver, the transceiver receives the first temporary signal from the base station during the connection response window duration, the wireless apparatus enters the first waiting duration after the first temporary signal is received by the transceiver, the temporary waiting status of the wireless apparatus in the first waiting duration is a power-saving status, the wireless apparatus further recovers from the power-saving status when the first waiting duration expires, and the transceiver further waits for a second temporary signal from the base station after the first waiting duration has expired but before the connection response window duration expires.

6. The wireless apparatus as claimed in claim 5, wherein the first temporary signal is a temporary connection setup signal, the second temporary signal is a temporary connection reject signal, and the transceiver transmits a connection setup complete signal to the base station when the connection response window duration expires if the transceiver does not receive the second temporary signal after the first waiting duration has expired but before the connection response window duration expires.

7. The wireless apparatus as claimed in claim 5, wherein when the transceiver receives the second temporary signal from the base station after the first waiting duration has expired but before the connection response window duration expires, the processor initiates a second waiting duration carried in the second temporary signal so that the wireless apparatus is kept in the temporary waiting status during the second waiting duration.

8. The wireless apparatus as claimed in claim 7, wherein the first temporary signal is a temporary connection setup signal, the second temporary signal is a temporary connection reject signal, and the transceiver is further configured to receive a connection setup signal from the base station during the second waiting duration when the communication controlling system is in a loadable status during the second waiting duration, and the transceiver further transmits a connection setup complete signal to the base station after receiving the connection setup signal.

9. The wireless apparatus as claimed in claim 7, wherein the first temporary signal is a temporary connection reject signal, the second temporary signal is a temporary connection setup signal, the processor takes the second temporary signal as a formal connection setup signal when the transceiver does not receive a connection reject signal during the second waiting duration, and the transceiver further transmits a connection setup complete signal to the base station.

10. The wireless apparatus as claimed in claim 7, wherein the first temporary signal is a temporary connection reject signal, the second temporary signal is a temporary connection setup signal, and the transceiver receives a connection setup signal from the base station during the second waiting duration and transmits a connection setup complete signal to the base station.

11. The wireless apparatus as claimed in claim 5, wherein the first temporary signal is a temporary connection reject signal, the second temporary signal is a temporary connection setup signal, and when the transceiver does not receive the second temporary signal after the first waiting duration has expired but before the connection response window duration expires, the transceiver transmits a retransmitted connection request to the base station when the connection response window duration expires.

12. The wireless apparatus as claimed in claim 1, wherein the temporary signal is a temporary connection setup signal, and the processor initiates a connection response window duration after the connection request is transmitted by the transceiver, the transceiver is configured to receive the temporary connection setup signal from the base station during the connection response window duration so that the processor initiates the first waiting duration, and the transceiver transmits a connection setup complete signal to the base station when the first waiting duration expires.

13. The wireless apparatus as claimed in claim 1, wherein the temporary signal is a temporary connection reject signal, and the transceiver is configured to receive the temporary connection reject signal from the base station, the temporary connection reject signal carries a listening duration, the wireless apparatus enters the first waiting duration after the temporary connection reject signal is received by the transceiver, the temporary waiting status of the wireless apparatus in the first waiting duration is a power-saving status, the wireless apparatus further recovers from the power-saving status when the first waiting duration expires, and the transceiver further waits for a connection setup signal from the base station during the listening duration after the first waiting duration.

14. The wireless apparatus as claimed in claim 13, wherein the transceiver transmits a retransmitted connection request to the base station when the listening duration expires if the transceiver does not receive the connection setup signal during the listening duration.

15. The wireless apparatus as claimed in claim 13, wherein the transceiver does not receive the connection setup signal during the listening duration and receives a connection reject signal from the base station when the listening duration expires, the connection reject signal carries a second waiting duration, the processor initiates the second waiting duration when the listening duration expires, and the transceiver further transmits a retransmitted connection request to the base station when the second waiting duration expires.

16. A base station for use in a communication controlling system, the communication controlling system comprising a wireless apparatus and the base station, the base station comprising:
a transceiver, being configured to receive a connection request from the wireless apparatus so that the wireless apparatus enters a connection setup communication procedure after transmitting the connection request and to transmit a temporary signal to the wireless apparatus after receiving the connection request, wherein the temporary signal carries a first waiting duration; and
a processor electrically connected to the transceiver, being configured to determine a status of the communication controlling system, wherein the status is one of a loadable status and an overload status,
wherein the wireless apparatus enters a temporary waiting status during the first waiting duration after receiving the temporary signal from the transceiver, and stays in the connection setup communication procedure in the temporary waiting status;
wherein the connection setup communication procedure is a procedure in which the wireless apparatus is going to set up a connection with the base station.

17. The base station as claimed in claim 16, wherein the temporary signal is a temporary connection reject signal, and the wireless apparatus initiates a connection response window duration after transmitting the connection request, the transceiver does not transmit a connection setup signal to the wireless apparatus during the connection response window duration and transmits the temporary connection reject signal to the wireless apparatus when the connection response window duration expires so that the wireless apparatus enters the first waiting duration after receiving the temporary connection reject signal, and the transceiver further receives a retransmitted connection request from the wireless apparatus when the first waiting duration expires.

18. The base station as claimed in claim 16, wherein the temporary signal is a temporary connection reject signal, and the wireless apparatus initiates a connection response window duration after transmitting the connection request, the transceiver transmits the temporary connection reject signal to the wireless apparatus during the connection response window duration so that the wireless apparatus enters the first waiting duration after receiving the temporary connection reject signal, the temporary waiting status of the wireless apparatus in the first waiting duration is a power-saving status, the wireless apparatus further recovers from the power-saving status when the first waiting duration expires, and the wireless apparatus waits for a connection setup signal from the base station after the first waiting duration has expired but before the connection response window duration expires.

19. The base station as claimed in claim 18, wherein the transceiver does not transmit the connection setup signal after the first waiting duration has expired but before the connection response window duration expires and transmits a connection reject signal to the wireless apparatus when the connection response window duration expires, the wireless apparatus initiates a second waiting duration carried in the connection reject signal so that the wireless apparatus is kept in the temporary waiting status during the second waiting duration, and the transceiver further receives a retransmitted connection request from the wireless apparatus when the second waiting duration expires.

20. The base station as claimed in claim 16, wherein the temporary signal is a first temporary signal, and the wireless apparatus initiates a connection response window duration after transmitting the connection request, the transceiver transmits the first temporary signal to the wireless apparatus during the connection response window duration so that the wireless apparatus enters the first waiting duration after receiving the first temporary signal, the temporary waiting status of the wireless apparatus in the first waiting duration is a power-saving status, the wireless apparatus further recovers from the power-saving status when the first waiting duration expires, and the wireless apparatus further waits for a second temporary signal from the base station after the first waiting duration has expired but before the connection response window duration expires.

21. The base station as claimed in claim 20, wherein the first temporary signal is a temporary connection setup signal, the second temporary signal is a temporary connection reject signal, and the transceiver receives a connection setup complete signal from the wireless apparatus when the connection response window duration expires if the transceiver does not transmit the second temporary signal to the wireless apparatus after the first waiting duration has expired but before the connection response window duration expires.

22. The base station as claimed in claim 20, wherein the transceiver transmits the second temporary signal to the wireless apparatus after the first waiting duration has expired but before the connection response window duration expires, and the wireless apparatus initiates a second waiting duration carried in the second temporary signal so that the wireless apparatus is kept in the temporary waiting status during the second waiting duration.

23. The base station as claimed in claim 22, wherein the first temporary signal is a temporary connection setup signal, the second temporary signal is a temporary connection reject signal, and the transceiver is further configured to transmit a connection setup signal to the wireless apparatus during the second waiting duration when the communication controlling system is in a loadable status during the second waiting duration, and the transceiver further receives a connection setup complete signal from the wireless apparatus after transmitting the connection setup signal.

24. The base station as claimed in claim 22, wherein the first temporary signal is a temporary connection reject signal, the second temporary signal is a temporary connection setup signal, the wireless apparatus takes the second temporary signal as a formal connection setup signal when the transceiver does not transmit a connection reject signal to the wireless apparatus during the second waiting duration, and the transceiver further receives a connection setup complete signal from the wireless apparatus.

25. The base station as claimed in claim 22, wherein the first temporary signal is a temporary connection reject signal, the second temporary signal is a temporary connection setup signal, and the transceiver transmits a connection setup signal to the wireless apparatus during the second waiting duration and receives a connection setup complete signal from the wireless apparatus.

26. The base station as claimed in claim 20, wherein the first temporary signal is a temporary connection reject signal, the second temporary signal is one of a temporary connection setup signal and a connection reject signal, and when the transceiver does not transmit the second temporary signal to the wireless apparatus after the first waiting duration has expired but before the connection response window duration expires, the transceiver receives a retransmitted connection request from the wireless apparatus when the connection response window duration expires.

27. The base station as claimed in claim 16, wherein the temporary signal is a temporary connection setup signal, and the wireless apparatus initiates a connection response window duration after transmitting the connection request, the transceiver is configured to transmit the temporary connection setup signal to the wireless apparatus during the connection response window duration so that the wireless apparatus initiates the first waiting duration, and the transceiver receives a connection setup complete signal from the wireless apparatus when the first waiting duration expires.

28. The base station as claimed in claim 16, wherein the temporary signal is a temporary connection reject signal, and the transceiver is configured to transmit the temporary connection reject signal to the wireless apparatus, the temporary connection reject signal carries a listening duration, the wireless apparatus enters the first waiting duration after the temporary connection reject signal is transmitted by the transceiver, the temporary waiting status of the wireless apparatus in the first waiting duration is a power-saving status, and the wireless apparatus further waits for a connection setup signal from the base station during the listening duration after the first waiting duration.

29. The base station as claimed in claim 28, wherein the transceiver does not transmit the connection setup signal during the listening duration, and receives a retransmitted connection request from the wireless apparatus when the listening duration expires.

30. The base station as claimed in claim 28, wherein the transceiver does not transmit the connection setup signal during the listening duration and transmits a connection reject signal to the wireless apparatus when the listening duration expires, the connection reject signal carries a second waiting duration, the wireless apparatus initiates the second waiting duration when the listening duration expires, and the transceiver further receives a retransmitted connection request from the wireless apparatus when the second waiting duration expires.

31. A communication controlling method for a communication controlling system, the communication controlling system comprising a wireless apparatus and a base station, the communication controlling method comprising the steps of:
(a) enabling the wireless apparatus to transmit a connection request to the base station so that the wireless apparatus enters a connection setup communication procedure;
(b) enabling the base station to transmit a temporary signal to the wireless apparatus after receiving the connection request, wherein the temporary signal carries a first waiting duration; and
(c) enabling the wireless apparatus to enter a temporary waiting status during a first waiting duration after receiving the temporary signal so that the wireless apparatus stays in the connection setup communication procedure in the temporary waiting status;
wherein the connection setup communication procedure is a procedure in which the wireless apparatus is going to set up a connection with the base station.

32. The communication controlling method as claimed in claim 31, wherein the temporary signal is a temporary connection reject signal, and the communication controlling method further comprising the steps of:
(d) enabling the wireless apparatus to initiate a connection response window duration after transmitting the connection request, wherein the wireless apparatus does not receive a connection setup signal from the base station during the connection response window duration;
(e) enabling the base station to transmit the temporary connection reject signal to the wireless apparatus when the connection response window duration expires;

(f) enabling the wireless apparatus to enter the first waiting duration after receiving the temporary connection reject signal; and (g) enabling the wireless apparatus to transmit a retransmitted connection request to the base station when the first waiting duration expires.

33. The communication controlling method as claimed in claim 31, wherein the temporary signal is a temporary connection reject signal, and further comprising the steps of:

(d) enabling the wireless apparatus to initiate a connection response window duration after transmitting the connection request;

(e) enabling the base station to transmit the temporary connection reject signal to the wireless apparatus during the connection response window duration;

(f) enabling the wireless apparatus to enter the first waiting duration after receiving the temporary connection reject signal, wherein the temporary waiting status of the wireless apparatus in the first waiting duration is a power-saving status, and the wireless apparatus further recovers from the power-saving status when the first waiting duration expires; and (g) enabling the wireless apparatus to wait for a connection setup signal from the base station after the first waiting duration has expired but before the connection response window duration expires.

34. The communication controlling method as claimed in claim 33, wherein when the wireless apparatus does not receive the connection setup signal after the first waiting duration has expired but before the connection response window duration expires and receives a connection reject signal from the base station, the communication controlling method further comprises the steps of:

(h) enabling the wireless apparatus to initiate a second waiting duration carried in the connection reject signal and to be kept in the temporary waiting status during the second waiting duration; and (i) enabling the wireless apparatus to transmit a retransmitted connection request to the base station when the second waiting duration expires.

35. The communication controlling method as claimed in claim 31, wherein the temporary signal is a first temporary signal, and the communication controlling method further comprising the steps of:

(d) enabling the wireless apparatus to initiate a connection response window duration after transmitting the connection request;

(e) enabling the base station to transmit the first temporary signal to the wireless apparatus during the connection response window duration;

(f) enabling the wireless apparatus to enter the first waiting duration after receiving the first temporary signal, wherein the temporary waiting status of the wireless apparatus in the first waiting duration is a power-saving status, and the wireless apparatus further recovers from the power-saving status when the first waiting duration expires; and (g) enabling the wireless apparatus to wait for a second temporary signal from the base station after the first waiting duration has expired but before the connection response window duration expires.

36. The communication controlling method as claimed in claim 35, wherein the first temporary signal is a temporary connection setup signal, the second temporary signal is a temporary connection reject signal, and the communication controlling method further comprises the step of:

(h) enabling the wireless apparatus to transmit a connection setup complete signal to the base station when the connection response window duration expires if the wireless apparatus does not receive the second temporary signal after the first waiting duration has expired but before the connection response window duration expires.

37. The communication controlling method as claimed in claim 35, further comprising the step of:

(i) enabling the wireless apparatus to initiate a second waiting duration carried in the second temporary signal so that the wireless apparatus is kept in the temporary waiting status during the second waiting duration if the wireless apparatus receives the second temporary signal from the base station after the first waiting duration has expired but before the connection response window duration expires.

38. The communication controlling method as claimed in claim 37, wherein the first temporary signal is a temporary connection setup signal, the second temporary signal is a temporary connection reject signal, and the communication controlling method further comprises the steps of:

(i) enabling the base station to transmit a connection setup signal to the wireless apparatus during the second waiting duration when the communication controlling system is in a loadable status during the second waiting duration; and (j) enabling the wireless apparatus to transmit a connection setup complete signal to the base station after receiving the connection setup signal.

39. The communication controlling method as claimed in claim 37, wherein the first temporary signal is a temporary connection reject signal, the second temporary signal is a temporary connection setup signal, and the communication controlling method further comprises the step of:

(i) enabling the wireless apparatus to take the second temporary signal as a formal connection setup signal and to transmit a connection setup complete signal to the base station when the wireless apparatus does not receive a connection reject signal during the second waiting duration.

40. The communication controlling method as claimed in claim 37, wherein the first temporary signal is a temporary connection reject signal, the second temporary signal is a temporary connection setup signal, and the communication controlling method further comprises the steps of:

(i) enabling the base station to transmit a connection setup signal to the wireless apparatus during the second waiting duration; and (j) enabling the wireless apparatus to transmit a connection setup complete signal to the base station.

41. The communication controlling method as claimed in claim 35, wherein the first temporary signal is a temporary connection reject signal, the second temporary signal is a temporary connection setup signal, and the communication controlling method further comprises the step of:

(h) enabling the wireless apparatus to transmit a retransmitted connection request to the base station when the connection response window duration expires if the wireless apparatus does not receive the second temporary signal after the first waiting duration has expired but before the connection response window duration expires.

42. The communication controlling method as claimed in claim 31 wherein the temporary signal is a temporary connection setup signal, and, further comprising the steps of:

(d) enabling the wireless apparatus to initiate a connection response window duration after transmitting the connection request;
(e) enabling the base station to transmit the temporary connection setup signal to the wireless apparatus during the connection response window duration;
(f) enabling the wireless apparatus to initiate the first waiting duration according to the temporary connection setup signal; and
(g) enabling the wireless apparatus to transmit a connection setup complete signal to the base station when the first waiting duration expires.

43. The communication controlling method as claimed in claim 31, wherein the temporary signal is a temporary connection reject signal, and further comprising the steps of:
(d) enabling the base station to transmit the temporary connection reject signal to the wireless apparatus, wherein the temporary connection reject signal carries a listening duration;
(e) enabling the wireless apparatus to enter the first waiting duration after receiving the temporary connection reject signal, wherein the temporary waiting status of the wireless apparatus in the first waiting duration is a power-saving status; and
(f) enabling the wireless apparatus to wait for a connection setup signal from the base station during the listening duration after the first waiting duration.

44. The communication controlling method as claimed in claim 43, further comprising the step of:
(g) enabling the wireless apparatus to transmit a retransmitted connection request to the base station when the listening duration expires if the wireless apparatus does not receive the connection setup signal during the listening duration.

45. The communication controlling method as claimed in claim 43, further comprising the steps of:
(i) enabling the wireless apparatus to initiate a second waiting duration when the listening duration expires if the wireless apparatus does not receive the connection setup signal during the listening duration and receives a connection reject signal from the base station when the listening duration expires, wherein the connection reject signal carries the second waiting duration; and
(j) enabling the wireless apparatus to transmit a retransmitted connection request to the base station when the second waiting duration expires.

* * * * *